United States Patent
Boudville

(10) Patent No.: US 10,346,826 B2
(45) Date of Patent: Jul. 9, 2019

(54) BLOCKCHAIN AND DEEP LINKS FOR MOBILE APPS

(71) Applicant: Wesley John Boudville, Los Angeles, CA (US)

(72) Inventor: Wesley John Boudville, Los Angeles, CA (US)

( * ) Notice: Subject to any disclaimer, the term of this patent is extended or adjusted under 35 U.S.C. 154(b) by 878 days.

(21) Appl. No.: 14/756,058

(22) Filed: Jul. 28, 2015

(65) Prior Publication Data

US 2017/0031874 A1 Feb. 2, 2017

(51) Int. Cl.
*G06Q 20/32* (2012.01)
*G06F 16/901* (2019.01)
*G06Q 10/06* (2012.01)
*H04L 29/12* (2006.01)
*H04L 9/32* (2006.01)
*G06Q 20/36* (2012.01)
*G06Q 20/38* (2012.01)
(Continued)

(52) U.S. Cl.
CPC ..... *G06Q 20/3224* (2013.01); *G06F 16/9024* (2019.01); *G06Q 10/063* (2013.01);
(Continued)

(58) Field of Classification Search
CPC .......... G06F 17/30864; G06F 9/44505; G06Q 20/12; H04L 41/0803; H04N 21/4524
See application file for complete search history.

(56) References Cited

U.S. PATENT DOCUMENTS 8,433,800 B2   4/2013   Chor
8,495,013 B2 *  7/2013   Kim .................. G06F 17/30575
                                                    707/610
(Continued)

OTHER PUBLICATIONS

"Apps Everywhere but no unifying link" by C. Dougherty, New York Times, Jan. 5, 2015.
(Continued)

*Primary Examiner* — Calvin L Hewitt, II
*Assistant Examiner* — Sima Asgari

(57) ABSTRACT

A deep link can have a name of a mobile app and a network address of a device on which an instance of the app is running. Deep links can be stored in a blockchain, along with related data, like the location of the device running the app. The deep links in the blockchain can be analyzed to make a social network graph. A node in the graph is a network address of a mobile device running a mobile app. An edge between 2 nodes is a mobile app, which had 2 instances of the app interacting, where each instance runs on one of the nodes. The edge could be directed, going from the first earlier instance to the second instance. A blockchain can be used by a mobile app to write a deep link referring to itself. The app instance is looking to interact with other instances of the app. Another device scans the blockchain to get the deep link. It makes an instance of the app that interacts with the instance that wrote the deep link to the blockchain. The deep link in the blockchain could have associated data like the start and stop times of an interaction with other instances. Thus a blockchain can promote the direct interaction of instances of mobile apps. The logic to decide whether an app writes a deep link to the blockchain can be instantiated as a Writer. This can exist inside the app, or on the device, but outside any app, or on the network. Also, the app server might use a Writer, where the Writer is on the server machine or on the network.

2 Claims, 14 Drawing Sheets

(51) Int. Cl.
*G06Q 50/00* (2012.01)
*H04W 4/00* (2018.01)

(52) U.S. Cl.
CPC ..... *G06Q 20/3229* (2013.01); *G06Q 20/3674* (2013.01); *G06Q 20/389* (2013.01); *G06Q 20/38215* (2013.01); *H04L 9/3239* (2013.01); *H04L 61/305* (2013.01); *H04L 61/35* (2013.01); *G06Q 50/01* (2013.01); *H04L 61/15* (2013.01); *H04L 2209/38* (2013.01); *H04W 4/00* (2013.01)

(56) References Cited

U.S. PATENT DOCUMENTS

| | | | | |
|---|---|---|---|---|
| 8,909,802 | B2 * | 12/2014 | Wonnacott | H04L 67/104 709/203 |
| 2008/0320053 | A1 * | 12/2008 | Iljima | G06F 17/30575 |
| 2013/0334300 | A1 | 3/2013 | Evans | |
| 2013/0110815 | A1 | 5/2013 | Tankovich | |
| 2014/0089413 | A1 | 3/2014 | Evans | |
| 2014/0201487 | A1 * | 7/2014 | Dudgeon | G06F 3/0647 711/165 |
| 2016/0142859 | A1 * | 5/2016 | Molinet | H04L 67/42 709/203 |
| 2017/0017954 | A1 * | 1/2017 | McDonough | G06Q 20/36 |

OTHER PUBLICATIONS

"How bitcoin could make back-office banking more rock 'n' roll" by D. Davies, Financial Times, Jun. 19, 2015.

"Bitcoin's blockchain catches Wall Street's eye" by P. Stafford, Financial Times, Jul. 1, 2015.

"Victory for adblocking software" by J. Vasagar, Financial Times, May 28, 2015.

\* cited by examiner

Figure 5 – Blockchain with location

Figure 6 – Social Network Graph

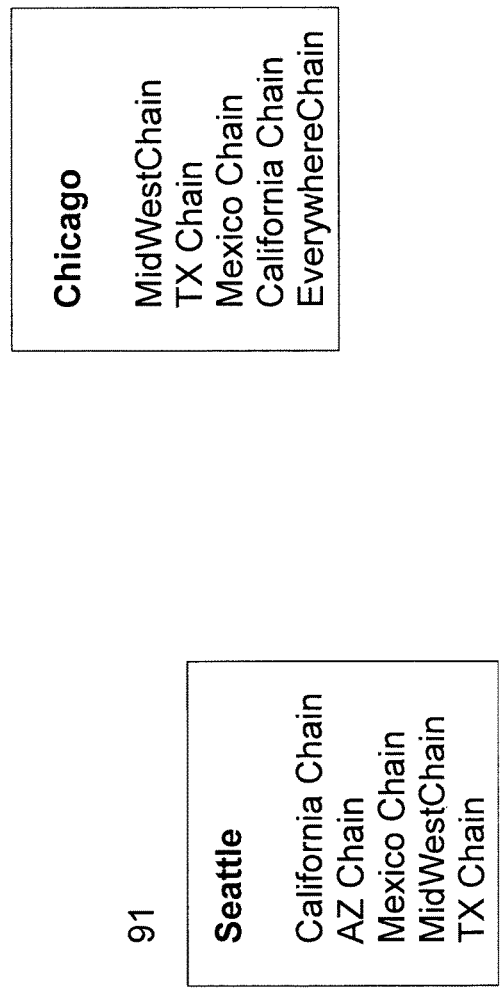
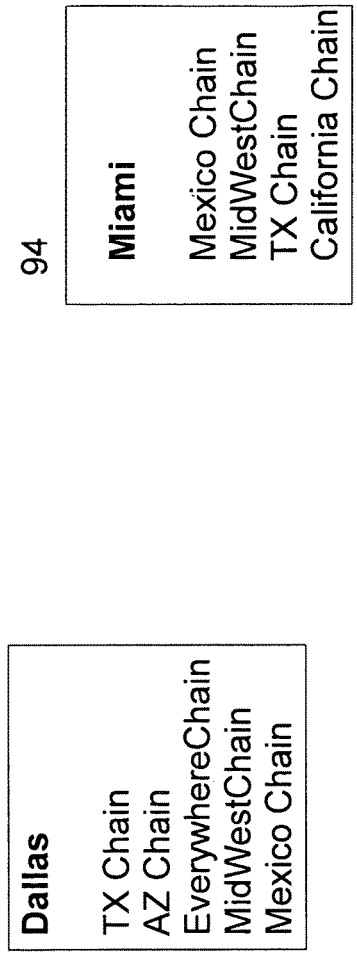
Figure 9
91 Seattle
California Chain
AZ Chain
Mexico Chain
MidWestChain
TX Chain
92 Chicago
MidWestChain
TX Chain
Mexico Chain
California Chain
EverywhereChain
93 Dallas
TX Chain
AZ Chain
EverywhereChain
MidWestChain
Mexico Chain
94 Miami
Mexico Chain
MidWestChain
TX Chain
California Chain

BLOCKCHAIN AND DEEP LINKS FOR MOBILE APPS

REFERENCES CITED

"Apps everywhere but no unifying link" by C. Dougherty, New York Times, 5 Jan. 2015.
"How bitcoin could make back-office banking more rock 'n' roll" by D. Davies, Financial Times, 19 Jun. 2015.
"Bitcoin's blockchain catches Wall Street's eye" by P. Stafford, Financial Times, 1 Jul. 2015.
"Generating and presenting deep links" by V. Tankovich et al, US Patent Application 20130110815 (Oct. 28, 2011).
"Methods and systems for facilitating an online social network" by C. Evans, US Patent Application 20140089413 (Dec. 6, 2013).
"Text-synchronized media utilization and manipulation based on an embedded barcode" by C. Evans, US Patent application 20130334300 (Mar. 27, 2013).
"Smart link system and method" by J. Chor, U.S. Pat. No. 8,433,800, (28 Feb. 2011).
ascribe.io

TECHNICAL FIELD

The field is deep links for mobile apps and a blockchain.

BACKGROUND

Mobile apps have a distinctive problem. Most are currently standalone programs, that often just converse with an app server run by the company that wrote the app. The apps do not have URL links within them.

It is much harder for a search engine, which is optimised to search the Web for webpages, to search arbitrary apps. There is no standard syntax equivalent to an URL or URI to enable this.

To enable such and other functionality in mobile apps has been termed 'deep linking' within apps. (The term also has an earlier use that refers to standard web pages and URL links within them. This submission does not use that earlier meaning.)

Major companies have several projects aimed at defining deep links. Facebook Corp. has App Links. Google Corp. has App Indexing. Twitter Corp. has App Cards. There are also several startups, like Branch Metrics Corp., Quixy Corp. and URX Corp., with their own initiatives. The syntax and functionality vary between these company-specific efforts.

Bitcoin has implemented a blockchain. The latter is a distributed electronic ledger of transactions. There is recent work by others to generalise the use of blockchains. One example is Ascribe Gmbh, a German startup company, which uses the Bitcoin blockchain to store the provenance (ownership history) of (mostly at this time) digital assets. It has produced SPOOL—Secure Public Online Ownership Ledger protocol and implemented this in a product. Directed at the art market for digital artworks.

SUMMARY

A deep link can have 2 fields—a name or identifier of a mobile app, and the network address of an instance of the app. A mobile device that gets the deep link can run a new instance of the app and have that instance connect to the instance in the deep link, for a direct multiuser app interaction. Deep links can be stored in a blockchain, along with related data, like the location of the device running the app.

The deep links in the blockchain can be analysed to make a social network graph. A node in the graph is a network address of a mobile device running a mobile app. An edge between 2 nodes is a mobile app, which had 2 instances of the app interacting, where each instance runs on one of the nodes. The edge could be directed, going from the first earlier instance to the second later instance.

A blockchain can be used by a mobile app to write a deep link referring to itself. The app instance is looking to interact with other instances of the app. Another device scans the blockchain to get the deep link. It makes an instance of the app that interacts with the instance that wrote the deep link to the blockchain. The deep link in the blockchain could have associated data like the start and stop times of an interaction with other instances.

Thus a blockchain can promote the direct interaction of instances of mobile apps.

There might be several blockchains. Some could be geographically restricted. An app that writes or reads to a blockchain could have a list of blockchains. The picking of a blockchain can depend on several factors, like the location of the app.

A deep link might be signed by the app that made it. If the deep link is used by another app, the latter could also sign it.

The logic to decide whether an app writes a deep link to the blockchain can be instantiated as a Writer. This can exist inside the app, or on the device, but outside any app, or on the network. Also, the app server might use a Writer, where the Writer is on the server machine or on the network.

A deep link can point to a blockchain. Letting a user run a blockchain app that gives easy access to the blockchain.

A first user can make a deep link pointing to an app, and with an identifier of her, assigned by the app server. If another person gets the deep link and installs the app for the first time, the server can credit the first user for propagating the app. This incents the first user to help promote the use of the app to people who have never heard of it.

Several deep links can be held in a queue and shown one at a time as a barcode on an electronic screen, or played as encoded audio. Each link points to a different user. When a deep link is decoded by a new user, her app communicates with an address in the deep link. She interacts with that user. Another deep link is then shown or played. This lets users advertise their services via deep links.

BRIEF DESCRIPTION OF THE DRAWINGS

FIG. 9 shows lists of blockchains.

DETAILED DESCRIPTION OF THE PREFERRED EMBODIMENT

Figure 1:
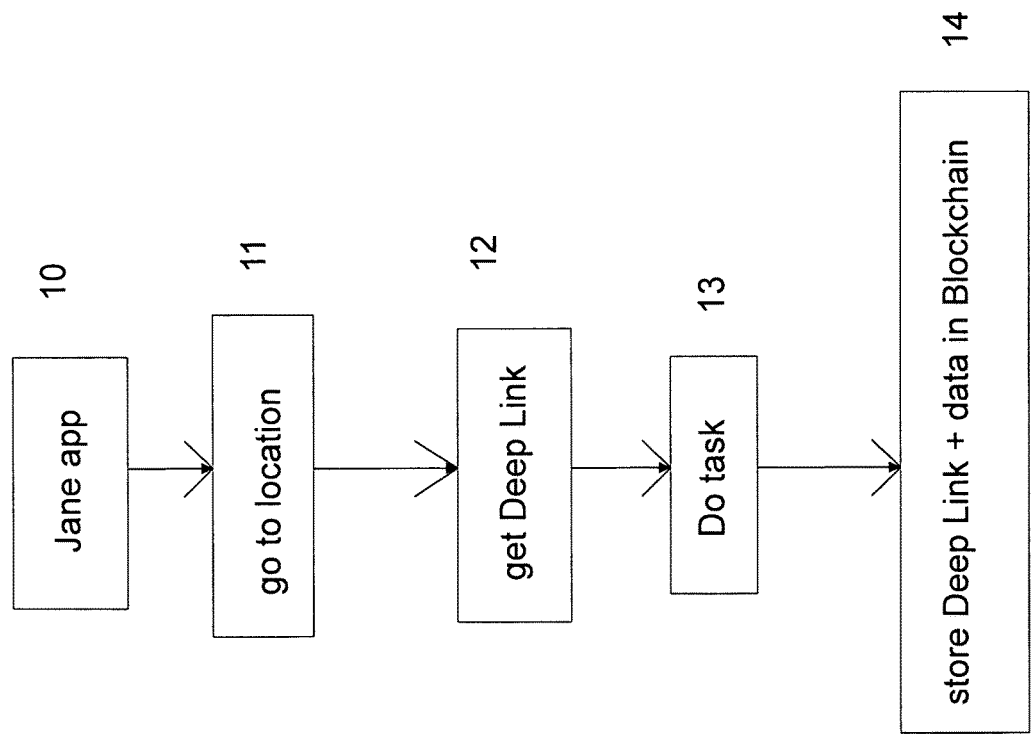
FIG. 1 is an app getting a deep link and writing it to a blockchain.

What we claim as new and desire to secure by letters patent is set forth in the following claims.

This submission refers to our earlier submissions to the US PTO: "Cellphone changing an electronic display that contains a barcode", filed 16 May 2011, U.S. Pat. No. 8,532,632 ["1"]; "Using dynamic barcodes to send data to a cellphone", filed 28 Jul. 2011, U.S. Pat. No. 8,348,149 ["2"], "Transmitting and receiving data via barcodes through a cellphone for privacy and anonymity", filed 4 Oct. 2011, U.S. Pat. No. 8,707,163 ["3"], "Colour barcodes and cellphone", filed 16 Dec. 2011, U.S. Pat. No. 8,821,277 ["4"]; "Mobile device audio from an external video display using a barcode", filed 25 May 2012, U.S. Pat. No. 8,708,224 ["5"]; "Dynamic group purchases using barcodes", filed 29 May 2012, U.S. Pat. No. 8,655,694 ["6"]; "Chirp to control devices", filed 9 Oct. 2012, US patent application 20140098644 ["7"]; "Barcode-based methods to enhance mobile multiplayer games", filed 22 May 2013, US patent application 20140349746 ["8"]; "Barcode, sound and collision for a unified user interaction", filed October 2013, US patent application 20150113068 ["9"], "Deep linking of mobile apps by barcode, sound or collision", filed Feb. 18, 2015, U.S. patent application Ser. No. 14/544,763 ["10"], "Cookies and anti-ad blocker using deep links in mobile apps", filed Jun. 8, 2015, U.S. patent application Ser. No. 14/545,694 ["11"].

In recent submissions "10" and "11", we described deep links and ways that these could enhance interactions between two mobile devices near each other. The current submission describes more ways for mobile interactions. Primarily now the devices need not necessarily be close to each other. And where one of the devices need not be mobile.

We define some terminology.

This submission is mostly about mobile devices carried or worn by people. The most common mobile device is a cellphone. We take this word to also include "smartphone". The latter term arose to describe a cellphone that also had a camera and Internet access, when such features were relatively new to cellphones. Other types of mobile devices are tablets, laptops, notebooks, netbooks, PDAs and wearable devices.

We will make frequent references to "app store" and "app server". Despite the similarity in names, these are different entities. An app store is typically run by a maker of a mobile device (like Apple Corp., Microsoft Corp.), or a provider of an operating system for mobile devices (like Google Corp.). Software companies that make mobile apps submit these to an app store. So users can find the apps in the app store and download them to the mobile devices. An app server is a server run by one of those software companies. A mobile user can use her device browser to go to the website of the app server, to download the app.

When we later describe an instance of an app interacting with an instance of another app, we might say, for brevity, a statement like "the first app interacts with the second app", when strictly it should be "an instance of the first app interacts with an instance of the second app". There should be no confusion with the use of the shorter phrase. But when 2 instances of an app interact with each other, a more precise phrasing is needed, like "a first instance of the app interacts with a second instance of the app".

This submission has the following sections.

1: Introduction;
2: Blockchain and Social Network Graph;
3: Blockchain for future events;
4: Blockchain access methods;
5: Deleting blockchain entries;
6: Lists of blockchains;
7: Signing a deep link;
8: Two different apps interacting;
9: Writing a deep link to the Blockchain;
10: Deep link pointing to a Blockchain;
11: Crediting the originator of a deep link;
12: Changing a deep link;
1: Introduction;

In the prior art, the concept of a blockchain has arisen. Primarily as the technology behind Bitcoin. But the idea of a blockchain has been generalised in various ways. The common facet is that a blockchain is a distributed electronic ledger. Entries can be written to it by various entities. The blockchain contents can be read and verified, typically by many entities. There might be restrictions placed on which entities can write to or read from the blockchain. Often, once an entry is put into the blockchain, it cannot be deleted. Though a variant is where an entry can have an expiration date. After that date, the entry would be removed from the blockchain.

One extension lets various data be stored in the blockchain. For example, the proposed Namecoin blockchain has this ability.

A blockchain need not necessarily encode financial transactions. In this submission, if a blockchain does this, it is not a requirement that all entries be transactions.

This submission combines a blockchain (and not necessarily the examples of Bitcoin and Namecoin) and deep links. Various implementations of deep links currently exist as proposed by Twitter, Facebook, Google and other firms. These differ from each other in the notation of a deep link and in the functionality or uses to which the deep link can be put. Primarily, the prior art on deep links is mainly concerned with the use of deep links on a single user's mobile device.

Basically, the generic use is typically this. A mobile user, Jane, uses a mobile travel app that lets her "wander" through a city, like Chicago. She is not actually in Chicago. The app shows maps and images of the city. In the app is a button that lets her buy a plane ticket to Chicago, or to reserve a ticket to a baseball game at a stadium in the city. But the button does not bring up a screen for buying within the travel app. Instead, the button invokes a deep link that installs and runs apps written by other firms, to do the ticket buying.

Thus the firm that wrote the travel app does not have to reinvent the wheel by writing ticket purchasing code. Instead, it calls pre-existing apps written by other companies, whose expertise is that. The similarity to a web page having a standard URL link to another web page at a different domain is clear.

In our earlier submissions "10" and "11", we described other types of deep links, which extend the prior art of deep links. Put simply, our deep links referred to instances of mobile apps running on mobile devices used by other users. Purely as an example of a deep link syntax, our user Jane might get a deep link written like "madcow://10.20.30.40:5810". In submission "11", this had the meaning that an app is called "madcow". An instance of it is running at the Internet address 10.20.30.40 and is listening on port 5810. Typically, the device at that address is another mobile device, used by Bob, say. His instance of madcow made the deep link, that refers to itself. Ergo, a reflexive or self-referential deep link. By various means in submission "11", the deep link was gotten by Jane.

(In this submission, we will use examples of Internet addresses in Internet Protocol version 4 notation. This is done for brevity. The generalisation to IPv6 is obvious.)

Her device has the "means" to take the app identifier "madcow" and install the app if it is not already installed. Then the app is run with the deep link as input. This tells the instance to connect to the address of Bob's instance. For example, madcow could be a two person game. Bob is the first player and he needs a second player, which turns out to be Jane, after he promulgated his deep link.

This "means" could be implemented by what we termed a "Deep Linker". This is code instantiated perhaps in the mobile operating system. Or perhaps as a separate program (another app?) invoked by the operating system or by the app that gets a deep link.

Now consider how a blockchain might be used with a deep link.

Jane and her mobile device go some place; a physical location and not a network address. These are shown as steps 10 and 11 in FIG. 1. She gets a deep link in step 12. Perhaps from scanning a barcode that encodes this deep link, where the barcode might appear on a hardcopy poster or electronic screen at that location. Or perhaps her device makes the deep link using data from other sensors on the device, like the device location. Perhaps her device combines data from several sensors. Like using her location in tandem with the compass direction that her phone is pointing in. She might be running an app already installed on her device. It could send its location to the app server, which combines this with data on the server to make a deep link, which is downloaded to the app.

There could be arbitrarily complex ways that the deep link could be made, as a function in part of the device location.

Her device runs the deep link, installing an app referred to by it, if necessary. The app does certain things, or it lets her do certain tasks. Note that here, the deep link does not necessarily have the address of another instance running on another device.

Suppose app or Jane and the app do some tasks correctly, in step 13. The former case could be where the app performs computations with no explicit action by Jane, with the possible exception of her starting the app. The correctness of the performing of the tasks might be decided by the app based on its internal data or in conjunction with the app contacting its app server (assuming the latter exists for the app).

Then the app or its server store the deep link and any related data in the blockchain in step 14.

(For simplicity in this and other sections, when we refer to an app storing a deep link in a blockchain, we include the case where the app server (if it exists) does the storing, unless explicitly excluded. Also, when the server does the storing, the deep link might be made on the app or on the server. In the latter case, the app could upload any necessary data about itself or its device to the server, to let the server make the deep link.)

The related data needed to make the deep link might include the location of Jane's device and its network address. And possibly any other identifier of the device or Jane. For the device, this might be or include a hardware id like a MAC address. And for example, if Jane has earlier used public key cryptography to make a public and private key pair, she might sign a string with her private key, and this signature is stored in the blockchain, along with the deep link.

In FIG. 1, a variant is where after step 10, the app gets the deep link in step 12, before going to a location in step 11. This location might be given by the app running the deep link.

Consider the above case where the device has a pre-installed app that makes a deep link once the device is at that location. The device could have some means, like GPS, to know its location. This deep link might have the name or identifier of the app written as the prefix or scheme in the deep link, like "madcow://". The deep link could also have the network address of Jane's app instance written into the deep link, like 11.12.13.14, after the above prefix.

Note that the address might not necessarily have an explicit port number. Perhaps the app has a hardwired port number, which never alters in any instance of the app. So for brevity, it can be omitted from the deep link. Or perhaps because the app does not listen on any port. Also, in the examples of deep links that we provide, the network addresses are given as raw numbers in IPv4 format, and not as domain names. Typically, the instances of the apps might have temporary Internet addresses. Because the mobile device accesses the Internet via a hotspot, and the hotspot allocates a temporary Internet address to the mobile device. Or the device accesses via a phone carrier, which proceeds to do the equivalent.

The app might also add her geographic location into the deep link. (How to do this was described in submission "11".) Then the app writes the deep link and any other related data to the blockchain.

A variant is where the location step 11 in FIG. 1 omitted. The location of Jane and her device is not germane to the deep link or the associated task.

A variant is where the deep link is not obtained by her device from an external source. And where her location might be moot. Instead, her app (madcow, say) is run, and it does some tasks, possibly but not necessarily involving her active participation. The app writes a deep link as a receipt after completion of the tasks, to the blockchain. The deep link might be "madcow://11.12.13.14", where the address is the address of the device. In this context, this deep link might not be intended to be accessible by another device. The app might not be listening at the address for a network query. Here, the deep link is meant as a compact notation with 2 parts—the name or id of the app and the address of the device that ran the app.

There could be extra parameters written in the deep link, or as associated data outside the deep link. Including the location, if this is germane or desired as part of the receipt.

In all this, we assume that the timestamp will be written by the blockchain.

A variant is where the deep link and any related data are not stored in the blockchain. Instead, a signature of this might be made, like a hash. And the hash is stored in the blockchain. Even in this case, there might be ancillary data that is not hashed but stored as plaintext.

When a hash or another type of signature of a deep link and other data is stored in the blockchain, the original deep link and other data might also be stored. Perhaps on the app server. The point is that at some future time, the storage server can demonstrate that it has the original combination of deep link and other possible data, that leads to the one way hashing result.

Another type of signature could be an encryption of the deep link and any other data, and it is the encryption that is stored in the blockchain. Or, the encryption itself might be hashed, and the hash is stored.

Another use case is where Jane's device makes a deep link at some location. The deep link could have the location embedded. She sends the deep link to Bob, where Bob might be near her (so essentially at the same location) or anywhere else.

Bob's device gets the deep link. The app on his device that uses the deep link might write it to the blockchain. Perhaps with his device location as related data. And other related data could include information about his device or her device.

Earlier in this section, we described how the an app that gets a deep link and which then runs it, might write it to the blockchain. Suppose Bob's app made a deep link pointing to itself. This deep link was somehow obtained by Jane's app. Our submissions 10 and 11 described several ways this could be done. (Here, we exclude using the blockchain to propagate the app; that is described in a later section). Her app runs the deep link to connect to Bob's app. It is possible for Bob's app then or later in the interaction to write the deep link that it made, or some modification of it, to the blockchain.

During the earlier making of the deep link, Bob's app can keep a record of the deep link, including possibly the time when it was made. His app waits (or has a thread waiting) at a port, for a connection from some other device. When Jane's app makes the connection, his app finds the address she is at, by inspecting the network packets. His app can append her address to the deep link it earlier made. It can also append the earlier time of that deep link. This resulting deep link can now be sent from his app to the blockchain. Equivalently, her address and the time of the original deep link might be grouped as related data to the original deep link, and the set written to the blockchain.

A deep link could have a variable that suggests whether the deep link should or should not be written to a blockchain. If the variable takes on the 'should not' value, then the app or the app server that gets the deep link should not try to write it to the blockchain. Similarly, if the blockchain gets a deep link, it can parse it, looking for this variable. If it exists with the 'should not' value, then the blockchain should not store it. This could arise when an app does not parse for that variable or does parse, but does not adhere to the recommendation. Of course, a rogue app might alter the variable and then forward the deep link to the blockchain for writing. But the blockchain should still check, for the case when an app inadvertently sent a deep link that should not be written.

In a later section, we discuss the possibility of several blockchains existing. The variable in the previous paragraph could be elaborated to have a 'should not' value specific to a given blockchain.

Figure 2:
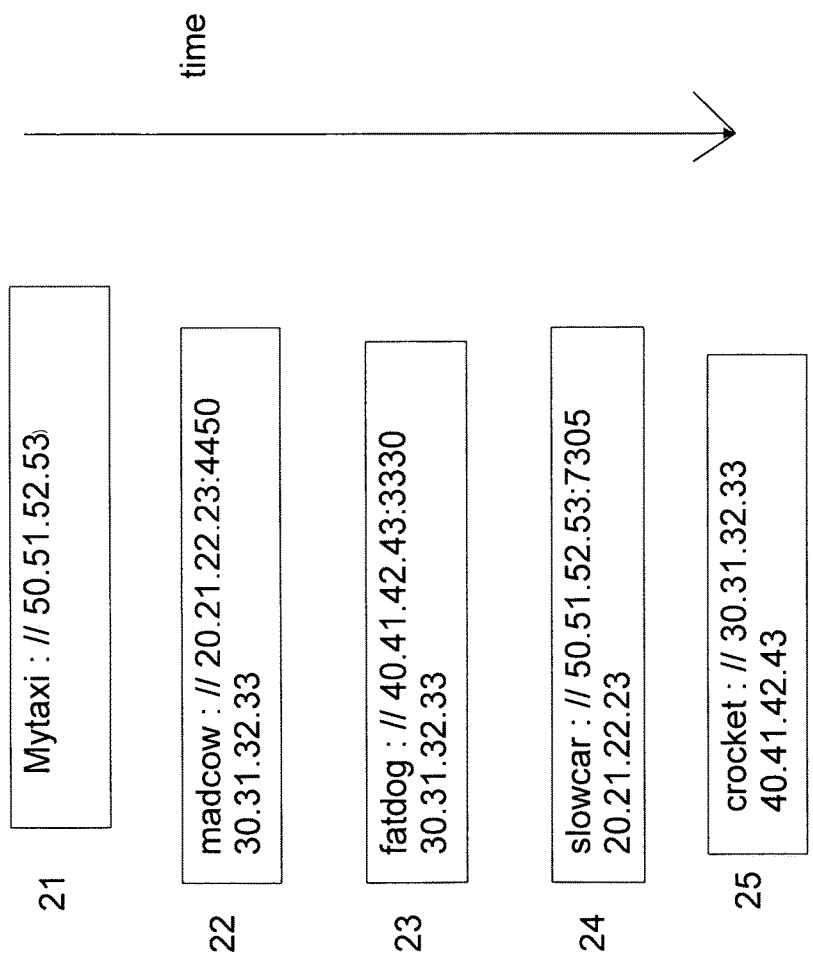
FIG. 2 is a blockchain with deep links.

2: Blockchain and Social Network Graph;

Now imagine that the blockchain has several deep links and affiliated data written to it, as described in the previous section. FIG. 2 shows an example of entries in the blockchain. The arrow on the right shows that time increases from top to bottom. Entries were written to the blockchain with the earliest at the top. The figure only shows a few entries for illustration; but there could have been other entries interspersed between these, and before and after. Also, the blockchain could have other entries with data unrelated to deep links or to other concerns in this submission. FIG. 2 and this submission do not need a blockchain to be dedicated to the purposes of this submission.

Entry 21 shows a deep link "mytaxi://", where the affiliated data is 50.51.52.53. This means that the latter is the address of the device that ran the app mytaxi. The latter could be a single user app, that does not interact directly with any other app, or with any other instance of mytaxi. This instance will typically interact with its server. For simplicity, we will refer to the device as "50". The content of entry 21 is essentially an instance drawn from the prior art work on deep links. Though we are not aware of any activity where prior art deep links have been stored in a blockchain.

Entry 22 shows a deep link "madcow://20.21.22.23:4450" which was run by the device at address 30.31.32.33. We refer to this device as "30". The entry means that the app madcow has an instance at 20.21.22.23, and this instance is listening at port 4450. We refer to the device at 20.21.22.23 as "20". Device 30 ran an instance of madcow which then communicated with the former instance.

Entry 23 shows a deep link "fatdog://40.41.42.43:3330" run by the device at 30.31.32.33. The latter is "30", as in entry 22. We refer to the device at 40.41.42.43 as "40". The instance at 40 listens at port 3330. The entry says that 30 interacted with 40.

Entry 24 shows a deep link "slowcar://50.51.52.53:7305" run by the device at 20.21.22.23. The latter is device 20, as defined earlier. The device at 50.51.52.53 is device 50, as defined earlier. The entry says device 50 was running an instance of slowcar, listening at port 7305. And the instance of slowcar run by device 20 interacted with the instance run by device 50.

Entry 25 shows a deep link "crocket://30.31.32.33" run by device 40.41.42.43. The latter is device 40, as defined earlier. The device at 30.31.32.33 is device 30, as defined earlier. Entry 25 omits the port in the deep link, compared to entries 22, 23 and 24. In part, a point of entry 25 is that a deep link can omit the port. Possibly if a default port is defined for a given app, so that it can be omitted for brevity in any logging.

Entries 22, 23, 24 and 25 refer to multiuser apps. We define "multiuser app" in this submission to be an app that lets its instances interact directly with each other. The instances can and often would also communicate with the servers. Commonly in the prior art, most multiuser apps interact strictly via their servers.

The format of the deep links in the entries is arbitrary. The example format is given for definitiveness, so that the reader can understand the gist, but is not meant to be limiting. Similarly, any other extraneous data (like the timestamp) in the entries has been omitted from FIG. 2.

Figure 3:
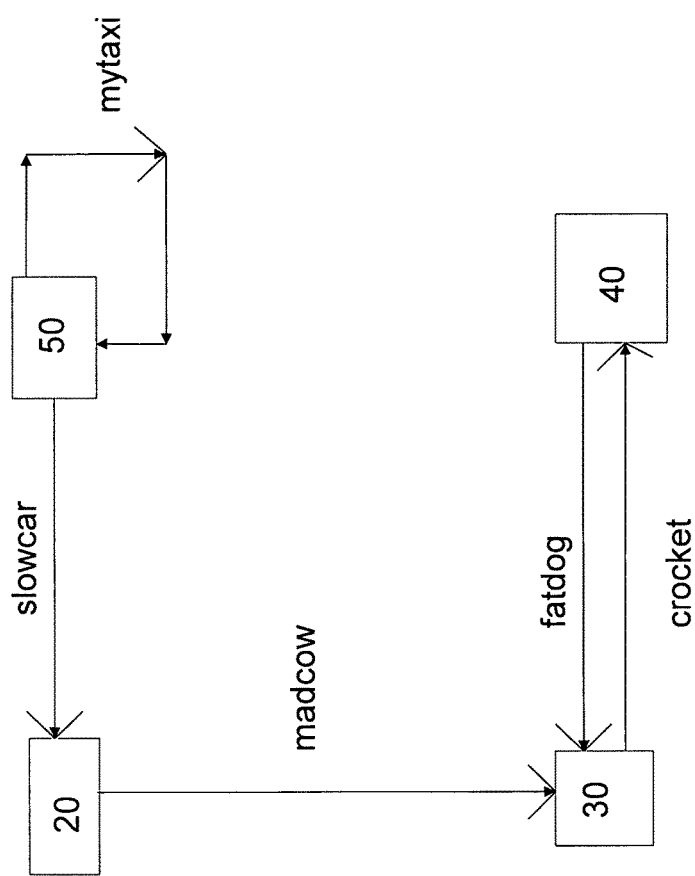
FIG. 3 is a social network graph derived from FIG. 2.

From FIG. 2 can be derived the social network graph of FIG. 3. This could be done by an analysis engine running on a machine that gets the above entries from the blockchain. The nodes are 20, 30, 40 and 50; these are the devices and their imputed users. Note that a device running an app need not have a human user. It might be an automated device, mobile or non-mobile.

Node 50 shows an edge starting and terminating at it, with the label mytaxi. This comes from entry 21 in FIG. 2. A reader with a background in physics can regard this as analogous to a self energy interaction in a Feynman diagram.

Node 50 has a directed edge going from it to node 20, with the label slowcar. This comes from entry 24 in FIG. 2.

Node 20 has a directed edge going from it to node 30, with the label madcow. This comes from entry 22 in FIG. 2.

Node 30 has a directed edge going from it to node 40, with the label crocket. This comes from entry 25 in FIG. 2. Node

30 also is connected to node 40, by a directed edge coming from node 40, with the label fatdog. This comes from entry 23 in FIG. 2.

A point about the edges between nodes 30 and 40 is that two devices can interact via different apps. And a node which starts the first instance of an app might at a later time be starting the second instance of another app, when interacting with another device.

The examples showed directed edges, with the direction going from the first instance to the second. There could also be interactions between 2 instances, where there is no directionality. This might correspond to the interaction being mediated by a third device, where there is no inherent meaning or useful meaning as to which instance was first. This can be shown in the graph as an undirected edge.

Not shown in FIGS. 2 and 3 for brevity, but which should be obvious given this text and what is in the figures, is where two devices interact via the same app. Where at one time, one device starts the first instance, and at a later time, the other device starts the first instance.

Figure 4:
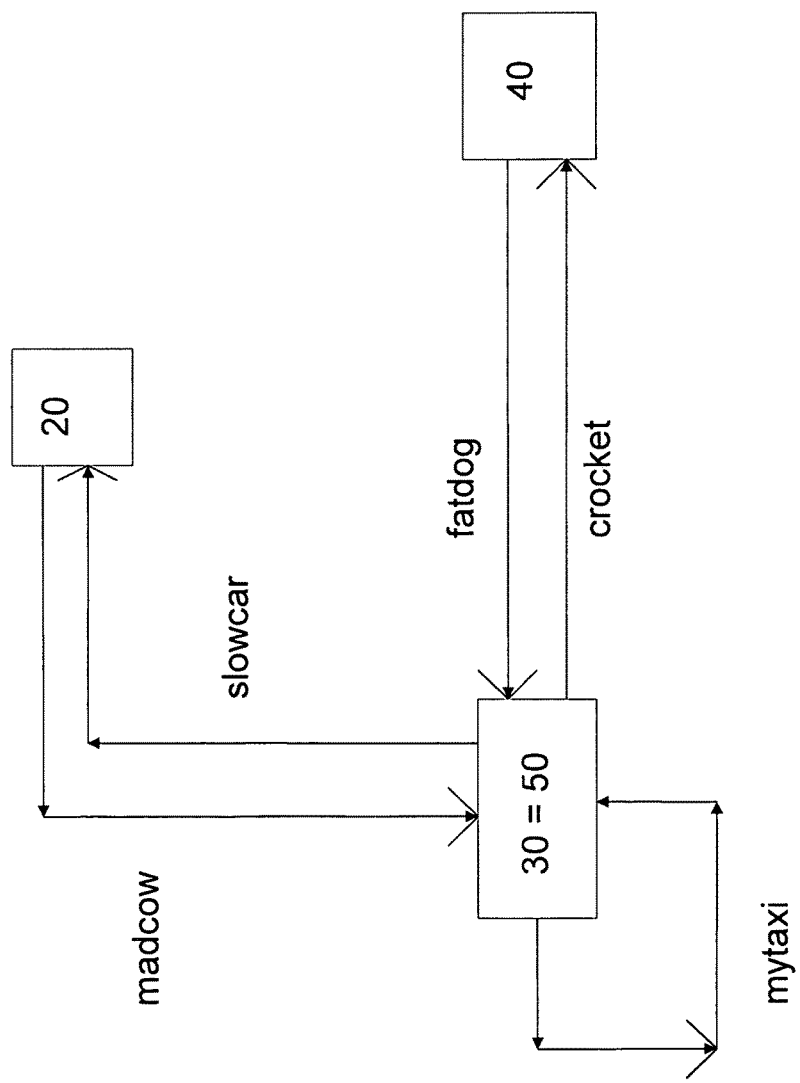
FIG. 4 is a social network graph derived from FIG. 3.

Now suppose that the analysis engine which made FIG. 3 has access to more data. Perhaps from the blockchain or from other sources. In part, the analysis engine might be a "conventional" search engine, like Bing or Google. If the engine can equate devices 30 and 50, then we can combine the nodes to get FIG. 4.

How can this equating be done? Perhaps at the hardware level. Where the devices 30 and 50 are found to be the same. One way can be if the device at different times has two different network addresses, 30 and 50. At one time, the device accessed the network via a hotspot, which temporarily assigned it address 30. At another time, the device went through a different hotspot (the device is mobile) and got a different temporary address. The equating was achieved if, say, the data written to the blockchain included a permanent hardware id like a MAC id.

The equating could have been done at the user level. Devices 30 and 50 are different devices, but owned by the same person. She has some id assigned to her (a "cookie" perhaps), and this was written to the entries for 30 and 50 in the blockchain. Or, external to the blockchain, the engine was able to map 30 and 50 to the same person.

Figure 5:
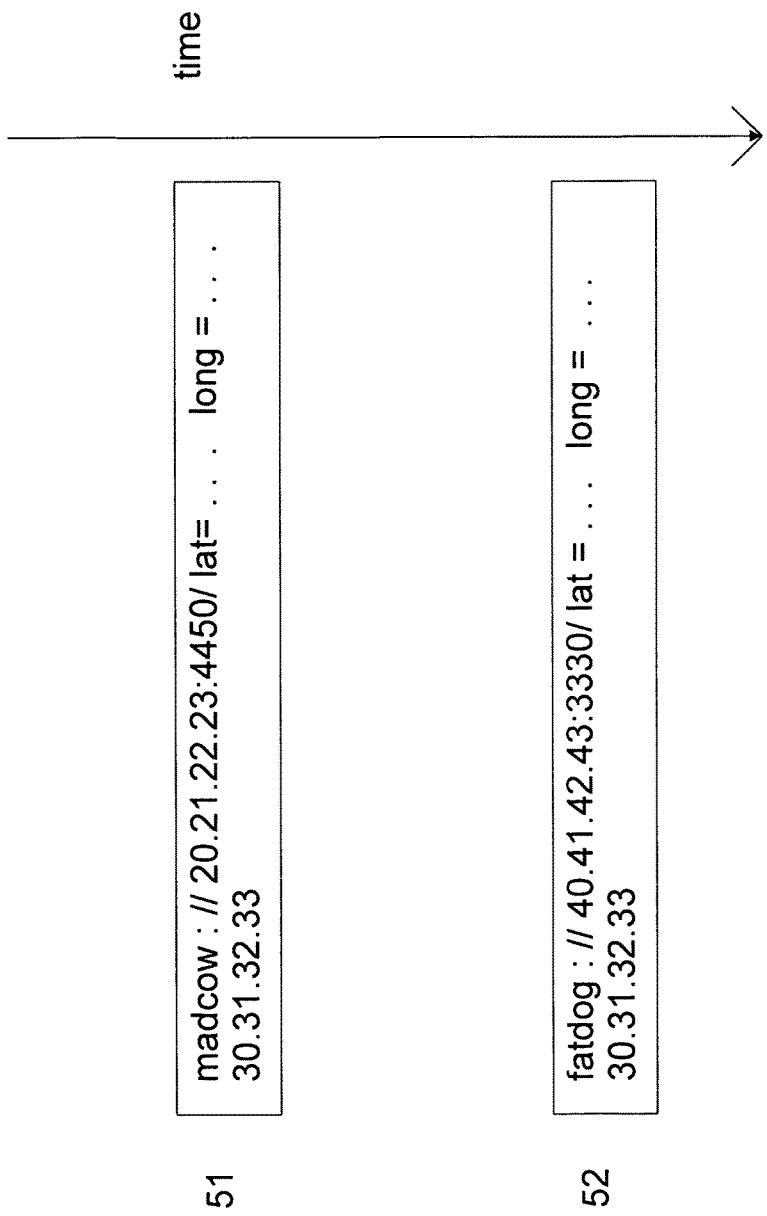
FIG. 5 is a blockchain with location in deep links.

More information could be encoded in the deep links. Given that a deep link is likely to be made or used by a mobile device, location information can be included. We discussed this in section 2 of submission "11". FIG. 5 shows a example, assumed to be a variant of FIG. 2.

Suppose that entries 22 and 23 are altered to include the latitude and longitude, while the other entries are kept unchanged. Then FIG. 5 shows only 22 and 23, relabelled as 51 and 52. Entry 51 might have been written by the madcow app, using a fiducial point in Chicago, like the location of City Hall. The app could write this same location for all locations of its instances in Chicago. While entry 52 used a deep link written by the fatdog app, which chose to fuzzify its location by rounding it to the nearest kilometer in latitude and longitude.

In FIG. 5, the location was supposed to be written as part of the deep links. The associated information, which are the network addresses of the second instances of the apps, is assumed not to have any location data. This was done to show how location data in the deep links themselves can readily be used. If the ancillary data also has location, then this can also be used.

Figure 6:
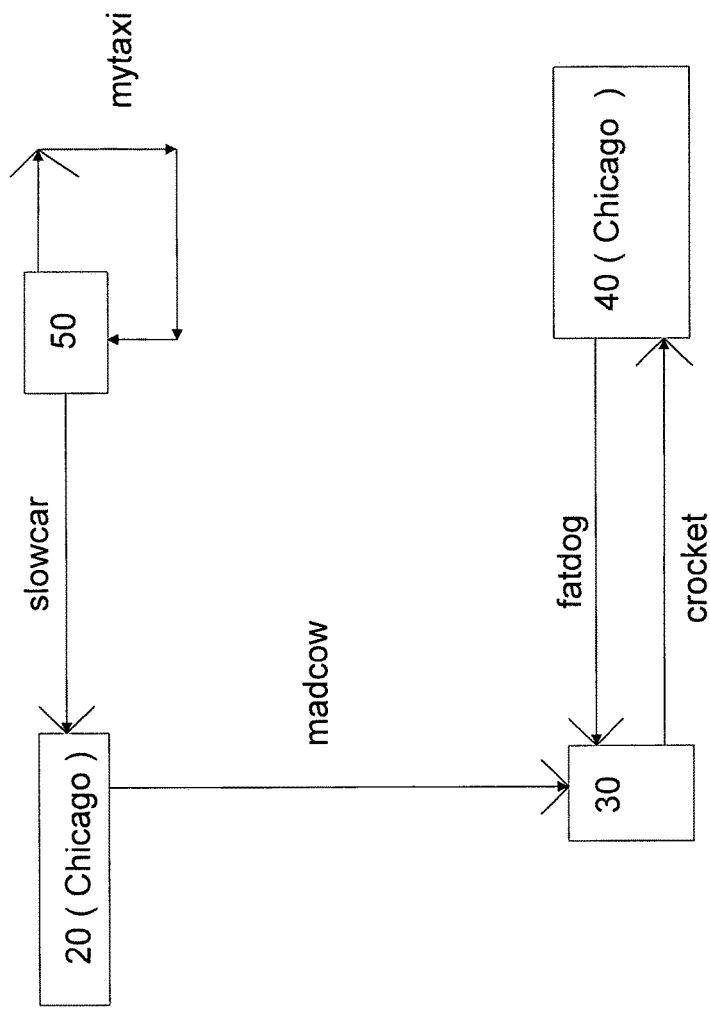
FIG. 6 is a social network graph using location.

If the locations in 51 and 52 are in Chicago, then we get FIG. 6. Nodes 20 and 40 now have the extra information Chicago. The analysis engine can use heuristics to infer that node 30 could be in Chicago.

For clarity, the examples given were 2 person multiuser apps. It is certainly possible to have apps where more than 2 people can interact.

Of course, the figures in this section define small and trivial social network graphs. But a large, non-trivial graph is built from such small associations. Given the success of social networks like Facebook Corp. and LinkedIn Corp., the reader can appreciate the value in being able to generate social network data from deep links stored in a blockchain.
3: Blockchain for Future Events;

One property that can be expected for any blockchain is its availability on the Internet. It will be widely distributed (replicated). Also, a blockchain is likely to be a well known and reputable destination. So one use is a distribution mechanism for deep links. The previous section discussed how a blockchain is used as an archive to record past events. The current section shows how to use it to schedule future events.

Figure 7:
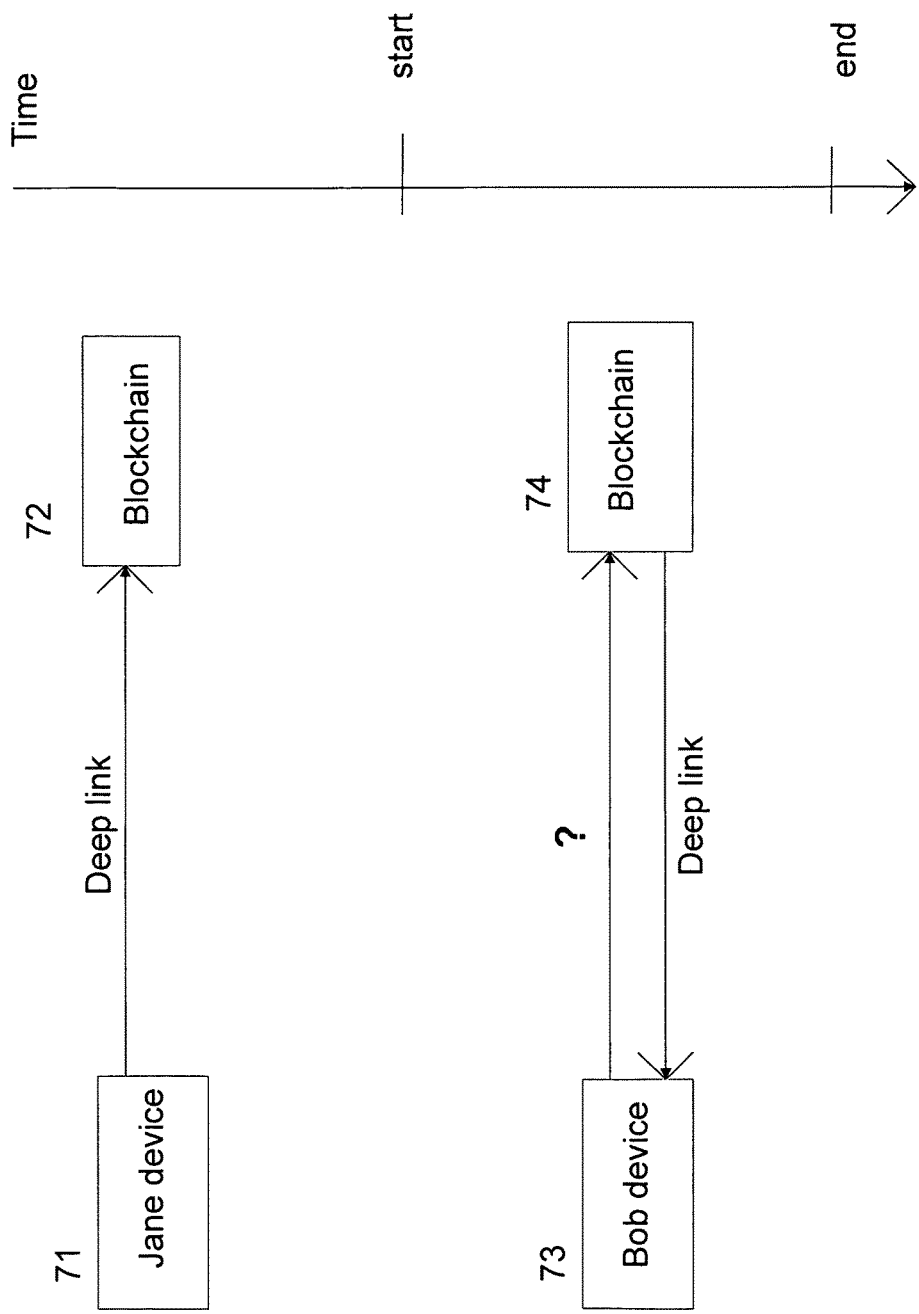
FIG. 7 is a scheduling of a multiuser app.

See FIG. 7. Jane uses her mobile device 71, assumed to be at the address 11.12.13.14, to make a deep link like madcow://11.12.13.14:8010 and then write this to the blockchain 72. There could be extra arguments inside the deep link, that describe the start and end times, between which her device will be running an instance of madcow, at the above address, and listening for queries. Or, the start and end times might be listed as ancillary data, accompanying the deep link entry in the blockchain.

In FIG. 7, the start and end times are indicated as such on the time line. One nuance is that if the instances interact before the end time, the interaction might extend beyond the end time. The end time refers to the latest time to begin an interaction. For brevity, the labels "Deep Link" omit mention of the associated data (if any).

In the deep link, or in data associated with the deep link that is also sent to the blockchain, Jane might specify a region within which the desired other person should be. Or conversely, where the person should not be in. This can be done via a geofence. There might be standard identifiers of geofences for common regions already defined. Like an id for Illinois, or for the city of Chicago. These ids could be maintained in a table external to the blockchain. The ids enable a compact label of a region, and might thus be added to the deep link.

Jane might also want to define a custom geofence. This could involve defining the geofence as data in the blockchain entry that is not part of the deep link.

In either case, if another user runs his instance of the app with the deep link from the blockchain, his app can check its location against the geofence, to see if it is eligible to interact with Jane's app.

The queries might be from other instances of madcow, or from instances of other apps.

This addresses one distribution problem of deep links that are meant to signify a multiuser application, as defined in this submission. If Jane wants her instance of the app to interact (e.g. play if the app is a game) with another instance, how to propagate this request? If the request is to people she already knows, she can just send them email or some other electronic message, enclosing the deep link. But to play strangers, they have to somehow find her deep link.

One alternative is for Jane to go to some well known website, like the website run by the company that made the madcow app. The website can have a lobby page, where people like Jane go to post their deep links. Other visitors can go to this lobby page and essentially click a deep link to play Jane, as the second player in her madcow app instance. This lobby page mechanism was described in submission "11".

However, another method is the above means of using a blockchain. A user, Bob, who wants to play an existing instance of madcow can start an instance of madcow on his device 73. It trawls Blockchain 74 (as indicated by the label "?" on the arrow going from 73 to Blockchain 74). Blockchain 74 returns "first player" deep links to 73. This is shown by the label "deep link" on the arrow going from Blockchain 74 to 73.

His app makes the equivalent of the web lobby page, by making a screen showing available players like Jane. The screen might show the start and end times. Or, if the current time is after the start time, but before the end time, the start time can be omitted.

Also, the information in the addresses in the deep links can be used. An approximate mapping is made from an address to a location. So the screen in Bob's app shows approximate locations. The list can be sorted by proximity to him. The closest players can give interactions with the lowest latency.

Given the start and end times in or associated with Jane's deep link in the blockchain, the blockchain could have a process that regularly scans its entries, and deletes any after the end times.

An advantage of the app using a blockchain to access the deep links is how it outsources or factors out the high availability to an entity (the blockchain) that is not the web and app server for the app. In general, a company that writes an app should not need to have a core skill about maintaining a highly available server. This is similar to how a company might access its email via a contract with Google Corp. to use gmail, or how it might maintain a web domain on Amazon Web Services.

Another issue that arises is capacity. Suppose when Jane filed her deep link (and any related data) to the blockchain, that she is looking only for one other player. What happens when Bob uses the blockchain to get the deep link and then becomes that second player?

At the simplest level, if another user asks the blockchain, and gets Jane's deep link and tries to access her instance, the latter can reject, giving an error message like "full". Or, when Bob becomes the second player, Jane's instance can send a signal to the blockchain, to delete her entry. To prevent spoofing, this could be signed with her private key. The blockchain can verify by using her public key.

4: Blockchain Access Methods;

For many uses of a blockchain in this submission, it is not necessary for the accessing program to perform validation operations on the blockchain. The program can assume that other programs have done this, to maintain validity of the ledger. Like the use in the previous section, the program just wants to do a read only access.

In this case, the blockchain can make available some simple search functionality. Possibly via an Application Programming Interface (API), to enable programmatic access.

An app maker can contract with the blockchain organisation to submit keywords associated with an app, along with the app name or identifier. For example, in the above madcow app, there might be keywords {"multiplayer", "gold", "treasure", "reward"}. Imagine a user who has never heard of the app madcow. She uses a program to submit queries to the blockchain, looking for games with the keywords {"treasure", "reward"}. The blockchain could return the name or identifier of madcow, as well as those of other apps with the same keywords; all apps assumed to be using the blockchain. Or it might return deep links for some or all of these apps.

The blockchain could charge the app developer for such services, giving one possible revenue source. This is another difference between the blockchain properties of this submission and the Bitcoin blockchain. For Bitcoin, there is deliberately no central management. The machines verifying and maintaining the Bitcoin blockchain derive monetary compensation (bitcoins) for their services. But that is only one possible blockchain arrangement. The blockchain suggested here can indeed have a managing organisation.

5: Deleting Blockchain Entries;

Above, we described where the blockchain might delete entries for various reasons. Especially if an entry has an end time. The delete can be implemented by moving the entry from the blockchain to a separate "deleted" data structure. But a key feature of many existing and proposed blockchains is that entries cannot be deleted. This could be considered an irreducible property of a blockchain.

In this submission, the blockchain can set a deleted flag for the entry, where all the entries are held in a time ordered list. The entries themselves always remain in the blockchain. The means of adding a deleted flag can be via an overlay structure maintained by the blockchain over its entries. This overlay can be written and altered.

An implementation can be done by a separate organisation. The access by apps is to a network service run by the organisation. The latter then writes and reads to the blockchain. And maintains the overlay. This lets this submission be retrofitted onto an existing blockchain.

Figure 8:
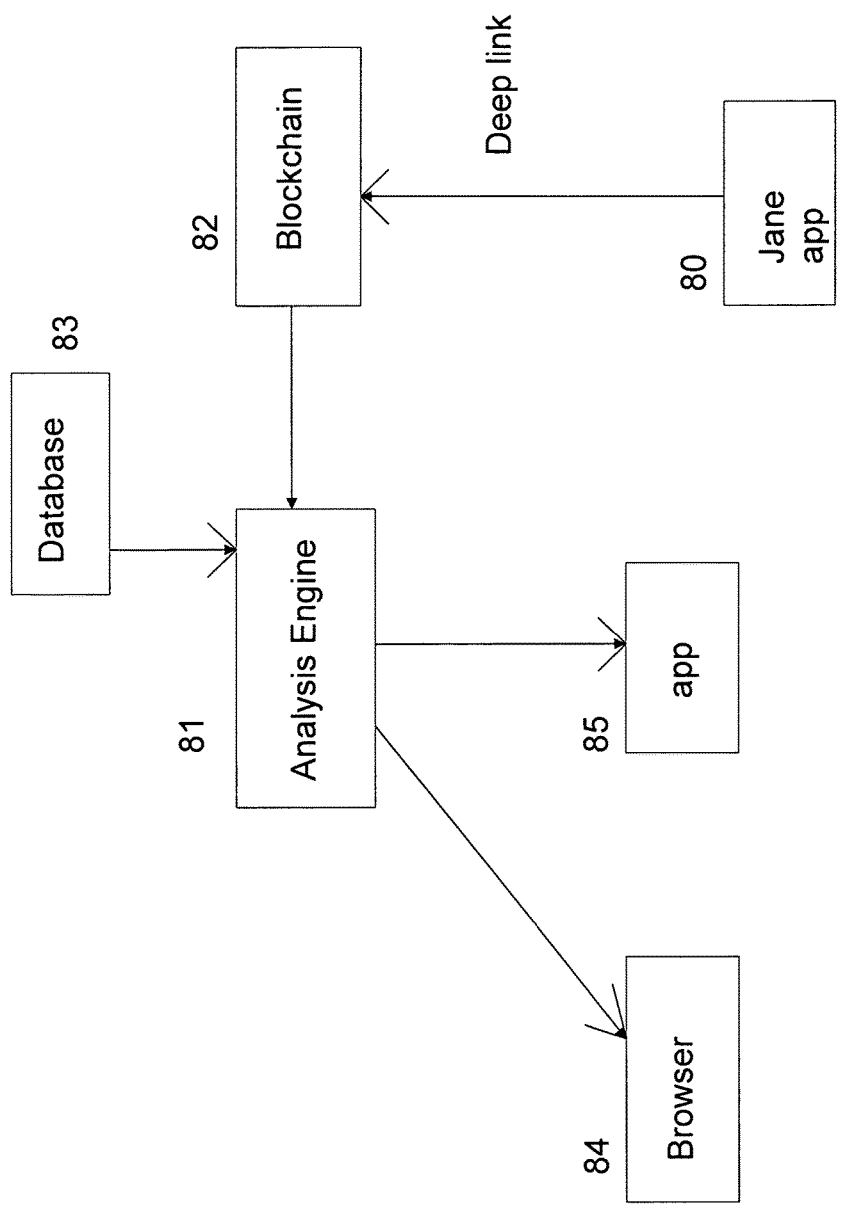
FIG. 8 shows an analysis engine using a blockchain.

An analysis engine can use expired data in (for example) making social network graphs. FIG. 8 shows the overall use of an analysis engine, both for this section and earlier sections. Item 80 is Jane app, which is an instance of an app running on Jane's device. The app makes a deep link, which is then submitted to Blockchain 82. In general, there will be many such submissions of deep links, by Jane and others.

Analysis engine 81 reads Blockchain 82. It treats Blockchain 82 as a special type of database. Analysis engine 81 also has Database 83, which can be regarded as a conventional relational database or a conventional no SQL database. Database 83 can also represent several such databases. This submission deliberately does not describe how a blockchain is made; only parts of its functionality. A given implementation of Blockchain 82 might use in part a standard relational database; albeit with more features for distributiveness and other distinctive aspects of blockchains.

Analysis engine 81 responds to queries from a web browser 84 and app 85. For the browser 84, the engine could write its reply in HTML. App 85 does not need to run on a mobile device. It could be a program, excluding a browser, which runs on a desktop computer.

FIG. 8 has variants. One is where instead of Jane app 80 directly submitting a deep link (and any related data) to the blockchain, there is an intermediate program. This could be the analysis engine itself, or a separate program, as discussed above. The analysis engine could be run by the same organisation that makes possible deleted entries.

In some or even preferred implementations of a blockchain and Jane app 80, the app hides all direct use of a blockchain. Jane need never know that a blockchain is being used behind the scene. The intermediate program could run on Jane's device or on a separate device. The latter might occur if the program is the analysis engine.

In FIG. 8, the unidirectional arrows indicate the overall direction of data flow. In general, there will be some data going in the opposite direction to an arrow. But this data would often be just control instructions.

6: Lists of Blockchains;

Just like many apps have inside them the address of their server, an app can have the address of a blockchain. The app then can write to and read from this blockchain. Or the app could have the addresses of several blockchains.

A variant is where the app lets its users define the address of a blockchain that is not in the list of preferred blockchains. But by default, if an app is going to use a blockchain, the user should not have to specify one.

Suppose an app has a list of blockchains. For mobile apps, the device that runs an instance of the app could be in different locations. This allows several possibilities. See FIG. 9. It assumes a given app whose instances are run across the US. Instance 91 is run in Seattle, instance 92 in Chicago, instance 93 in Dallas and instance 94 in Miami. Each has a sorted list of blockchains. The top item in the list is the preferred blockchain for that location. How large this location area can depend on the app and on the properties of the blockchains.

Most of the blockchains are assumed to have a geographic preference, as reflected in their names. So TX Chain has most or all of its machines holding the chain in Texas. Likewise with the other chains. Then there is Everywhere-Chain, whose machines could be all over the world.

There are several concepts here and in FIG. 9. First, there could be several blockchains for an app. Second, a blockchain could be geographically concentrated. Third, a blockchain could have no geographic focus. Fourth, the list of blockchains could have both types.

Fifth, the sorting in the list is a function of the location of the app. For instance 94 in Miami, the preferred or default blockchain is Mexico Chain. This might be the closest blockchain. In general, proximity is good, to improve responsiveness.

Sixth, the unsorted lists of blockchains need not have the same contents. Instance 91 in Seattle uses the AZ Chain, which in not in the list for instance 94 in Miami.

Another reason for sorting a list could be the cost. A blockchain might charge for its use. To be levied against one or more of the users or the app company. There could be a tradeoff—use a closer blockchain for less delay but pay more, compared to using a cheaper blockchain that is further away.

A user could get a list of blockchains on her app, and she picks one. She might be able to edit the order in the list. Or to add or remove blockchains from the list, based on her own criteria.

A further implication of FIG. 9 is that it is desirable to have an API through which the app accesses a blockchain. This lets the app easily and uniformly allow a choice between different blockchains. It also permits a business model where different organisations could make blockchains as a product.

7: Signing a Deep Link;

This section describes how a deep link could be signed prior to insertion into a blockchain. The deep link involves 2 instances of an app interacting.

For clarity, earlier sections omitted such details. See FIG. 10. It is a flowchart. Imagine a user Bob, who runs an app, madcow, on his device 23.24.25.26. The app wants a second user. Bob's app does step 101 to make the string "madcow://23.24.25.26". For simplicity, we omit the port number.

Suppose Bob has a public and private key. He, or rather his app instance, can use his private key to encrypt the string 101, getting another string that we call "Bob signature". He appends this to string 101, giving string or step 102.

A variant is where the signing can be just of Bob's device address or of the app name. Stronger is where the signing is of the entire string 101. This locks together the app name or id and the address of its instance.

By various means, Jane gets string 102. Her device is assumed to be at address 41.42.43.44. Through the steps in the earlier sections, she starts her instance of the madcow app. Her instance appends her address to make string or step 103.

Jane is also supposed to have a public and private key. Her app signs most or all or string 103. As can be seen, string 103 has 4 parts—the app name or id, Bob's device address, Bob's signature and Jane's device address. The strongest signing would be to sign the entire string. But a weaker signing of fewer fields of string 103 may be done as a policy decision by the app.

Jane's signature is then appended to string 103 to make string 104. This string can be written by her app instance to the blockchain, possibly along with associated data.

A variant is where the associated data is also signed by Jane.

Item 105 is the general structure of item 104.

Figure 10:
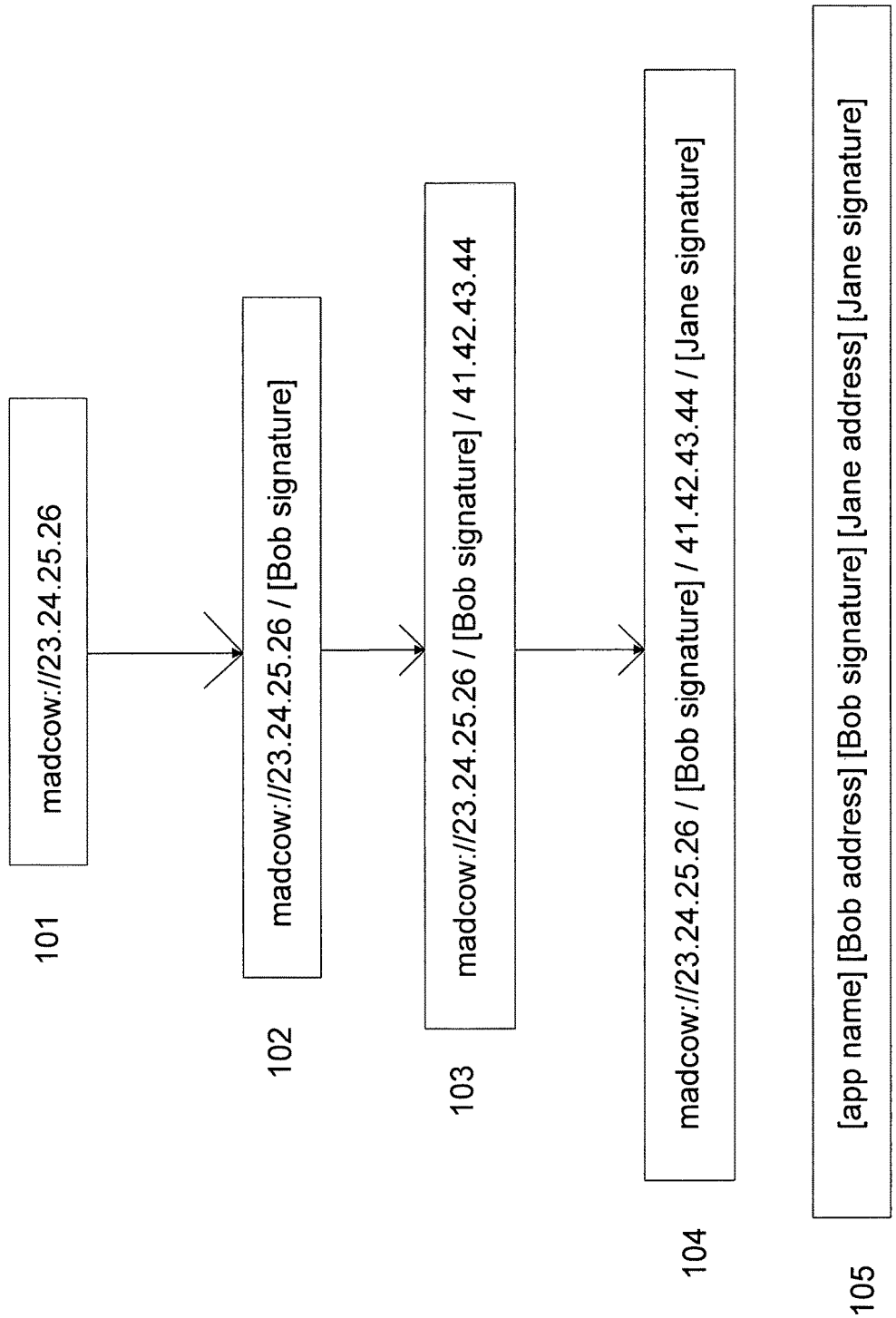
FIG. 10 is a signing of a deep link.

As an aside, FIG. 10 deliberately has white space preceding and following the forward slashes ("/") in the steps. Purely to improve visual clarity for the reader. In any actual implementation, such white spaces would not be used in the strings.

The above is given as an example, and is not meant to be limiting. But it is modular and has a left to right appending. We suggest these are useful properties that any signing of a deep link by multiple parties should have.

Suppose the app was a one person app. Bob might still want to record his use of it to the blockchain. In this case, after his app made string 102, the latter (and any associated data) would be written to the blockchain.

8: Two Different Apps Interacting;

Thus far, we described the use of a deep link that was for two instances of the same app interacting. A variant is where an instance of one app interacts with an instance of a different app. Here, there might be 2 deep links used. One deep link refers to the instance of the first app. The other deep link refers to the instance of the second app.

In turn, there are 2 possibilities. One is that both apps are running on the same device, being used by the same person. This situation is largely the prior art. The other case is each app runs on a separate device. The devices could be run by the same person or 2 persons.

In all cases, the data to be stored about the interaction could be the address of the first device and the name or id of the first app. And then the deep link used in the first app to access the instance of the second app. The order of writing indicates which app called the other app.

The data about the first instance could be written as two fields, separated by some delimiter. Or, equivalently, as a simple deep link, like "madcow://11.12.13.14", where the address is the address of the first device, and madcow is the name of the app. Note that this deep link is synthetic, in that it might never have been made or used in the interaction. Rather, it writes the data in a natural way consistent with the actual deep link used by the first app to get the second app.

There is value in doing this. It presents a unified view of the apps and their interactions. It is compatible with making a social network graph by an analysis engine, as described in earlier sections.

9: Writing a Deep Link to the Blockchain;

In earlier sections, we described writing a deep link to the blockchain. Here we examine this in more detail. See FIG. 11. Jane runs or gets a deep link. How to decide if it should be written to the blockchain? For example, should this be done at the time when the deep link is run? Or should it be done later?

One method is for an option in madcow that Jane can pick, to tell it to write the deep link. This is a manual operation by Jane. But logic can be made, which is the primary focus of this section, to aid her in future decisions, by minimising the manual steps she has to do.

Madcow 1101 talks to its app server 1103. Likewise the app fatdog 1102 talks to its app server 1104. In general, the apps are run by different companies, and the servers 1103 and 1104 are on different machines and do not share information.

The logic to suggest when to write the deep link, and to write it if a decision has been made to do so, is depicted as Writer 1105. The writing can be done by the Writer sending the deep link to Blockchain 1106.

Suppose for the moment that madcow's deep link runs the app fatdog on the same device as madcow. The Writer can be code inside the executable of an app. If this is true for both madcow and fatdog, then there are 2 instances of Writer on Jane's device.

Another case is where the Writer is common code that has been installed on the device and is available for apps to call. The Writer might be a library of the device operating system, by default. Or it might have been installed as a third party library. A variant of this is where there are several Writers on a device; just like a device might have two browsers installed.

Another case is where the Writer is a service (like a Web Service) that is accessible by the apps via the network. Similarly to the previous paragraph, having the Writer be on the network means there could be several such Writers.

If there are several Writers on a device, there is no requirement that they run the same API for apps to use them. Though it could be desirable that a recommended API exists for these Writers, to make it easier for an app to choose between them. Similar remarks apply to network Writers.

Also, suppose there is an API for device Writers. It would be preferred that the API for network Writers be as similar as possible. So programmers coding an app use much the same logic to call a Writer that is outside the app.

These cases are not mutually exclusive. Some apps could come with a Writer built into them, while other apps might access a Writer on the device, if that Writer exists. While other apps could use the network Writer. A given app could have logic to try all three cases, and apps that do this might have different logic, leading to different sequences of access.

Suppose an app has an internal Writer. The Writer might ask a Writer outside the app, that is present on the device. Also, it might ask a Writer on the network.

For a Writer on the device, and outside any app, there could be different such Writers. With different rules and possibly different specialisations. Likewise there could be several Writers on the network.

Thus far, we described where the Writer could be on the client (app) side. What sort of decision logic could the Writer have?

The Writer could record a manual decision by Jane when running madcow to write the deep link, and store various related data about her use of madcow. If Jane later runs another instance of madcow, the Writer can use this to guide whether to write the deep link or not.

For example, suppose madcow has several deep links, and when Jane ran madcow, she invoked several of those. But for only one deep link did she tell madcow to save it to the blockchain. The specific nature of this can suggest to the Writer that in the next running of madcow, to write that given deep link if Jane invokes it again. At the GUI level, this can be done by the Writer causing a popup dialog that suggests this to her, based on her action in the earlier instance. It reduces the cognitive load on her.

The dialog could have an option that tells the Writer that in future runs, to just do the writing of the deep link as a default. So she does not have to meet this dialog every time. This further reduces the manual and cognitive loads on her.

If Jane runs madcow several times and does several manual writings of deep links, then the Writer could make statistics on her writing decisions. Giving more guidance to its recommendations.

An example is where the fatdog app, which is called by the deep link in madcow, is on another machine, possibly at another location and run by a different person. Jane interacts via madcow with the remote app for an extended period of time, and then manually tells her app to write the deep link. The Writer can use the duration of time of the interaction as a factor (and not necessarily the only one) in future suggestions or decisions. If the interaction is long, say over an hour, like in an extended game or task, this suggests a valuable interaction that Jane wants the blockchain to make a record of.

An example concerns where Jane's app interacts via the deep link with another person's app. If the Writer has access to Jane's social network then it can try to see if the other person is in her network or not. If it can do this, then perhaps it sees that the person is outside her network. A stranger, perhaps. So she wants a record made. Whereas for people inside her network, she trusts them and does not want a record made.

How can the Writer do this from just a deep link? It can look, if possible, at the circumstances inside madcow where the deep link appears. Suppose the link is inside an electronic message from Bob, that appears in a madcow window, and the Writer can get Bob's name and email address from that message. Then from Jane's social network, the Writer finds that Bob is not known to her.

By social network, we mean several social networks that Jane might be in, and to the extent that Writer can access any of these. This also includes by default, Jane's address books in her email accounts.

Another example is where on several occasions using madcow, Jane has been in the same location when she told it to save a deep link. This assumes that the device has location information, and has been moving, and that madcow and Writer have access to this. Perhaps the app refers to some task Jane is performing, that involves her travelling to different places, like she is a private taxi driver or delivery person.

Another example is where on several occasions, Jane has run madcow at or around the same time of day, and manually asked that the same deep link be written to the blockchain. Here, it is the same app, same time and same deep link that together could act as a guide to the Writer to then do this save automatically in future if those events occur again.

Another example is where the app makes a financial transaction, and then Jane tells it to write a related deep link. It might be objected that these transactions are securely recorded in bank computers. Why also record the related deep link? One answer is that the bank records are meant to be intensively private. Usually only the bank and the account holder can see these. But there may be reason that Jane wants a public record on the blockchain. So others can verify a presumably authoritative financial event.

The above examples where the Writer looks for various factors are easiest to do when the Writer is part of the app, from the perspective of being able to access data in the app. However as can be appreciated from the examples, the logic of the Writer can get quite intricate. If the Writer is a separate program or library on the device, then this frees the authors of the app from having to write such logic. The tradeoff is increased complexity in the Writer getting the app data. There could be an API that the Writer offers, for the app to use to push relevant data into the Writer. Or there could be another API, that the app instantiates, so that the Writer pulls the data from the app. Or both the app and Writer might implement different but complementary APIs.

There is another advantage to having a Writer outside the app. It can (with the user's permission) aggregate data from her uses of different apps. This gives more information for it to offer guidance about writing deep links (and related data). With apps, a strict security precaution imposed by the operating systems is that essentially each app lives in its own sandbox on the device. An app cannot access the data stored by another app, in general.

Suppose the Writer is outside the device; it is accessed on the network. The remarks of the previous paragraph also pertain. Here, there might or should be more stringent precautions compared to when the Writer sits on the device. The potential is a network Writer is that it can amass statistics on the behaviour of many users, using many apps. From more statistics, the predictions of typical user behaviour can be used to make predictions about if and where in the running of an app, a writing should be done of the deep link to the blockchain.

Figure 11:
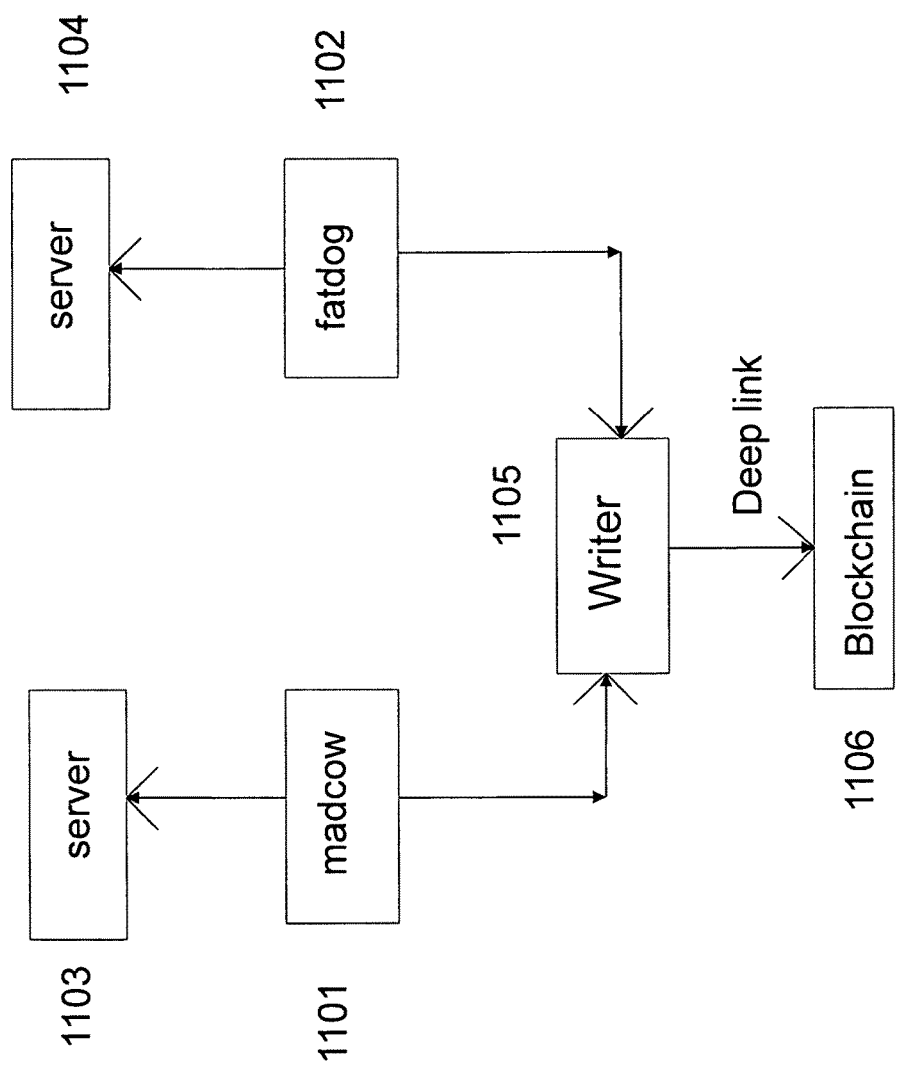
FIG. 11 is a writing of a deep link from the app.

Now suppose that the Writer has decided to write the deep link. The way shown in FIG. 11 is for the Writer to send the deep link to the blockchain. This is not mandatory but is preferred. An alternative is for the Writer to communicate back to the calling app, and the latter handles sending the deep link to the blockchain.

Figure 12:
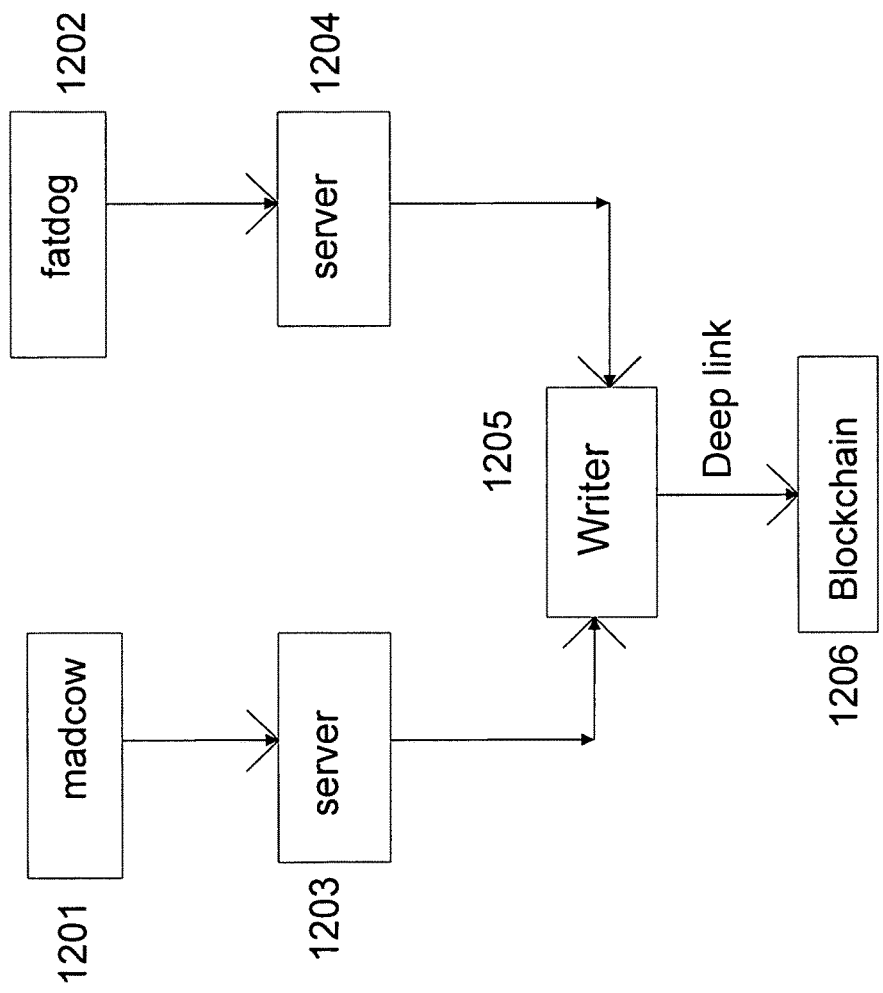
FIG. 12 is a writing of a deep link from the app server.

The Writer can also be on the server side. See FIG. 12. There is the madcow app 1201 with its server 1203, and the fatdog app 1202 and its server 1204. The servers 1203 and 1204 are in general different machines. They use instances of Writer 1205.

One case is that each server has a Writer on its machine. Each Writer might have been written independently of the other. Another case is where a Writer sits on the network and is called by the app server. A Writer which does this might also offer such services to a client side app, as described earlier. The network Writer could offer the same API to both the app and the app server.

Section 6 described how an app could have a list of blockchains, where this assumes the existence of more than one blockchain. That section had no explicit description of a Writer. If Writers now exist, then they can also hold logic to maintain and chose from a list of blockchains.

A variant is where outside the Writer, and in the app, there is logic to maintain and pick from that list. This can be desirable to break up in a modular manner the various functionalities. The choice of blockchain might be input to the Writer.

If some blockchains are mostly in one region, then so too might some Writers. Especially if those Writers have a preferred use of those blockchains. These Writers could check the location of the device running the app, and then use this to influence the choice of blockchain.

10: Deep Link Pointing to a Blockchain;

Earlier sections considered the case where a deep link is put in a blockchain. This section considers where a deep link points to a blockchain. Suppose there is the deep link "bchain5://". The "bchain5" is the name or id of a given blockchain. As described in submissions 10 and 11, on a user device there is assumed to be software (a "Deep Linker") that can take this name and search an app store or app server and download the app corresponding to bchain5. The app is then started. The app is assumed to have been written by the organisation or company that made or maintains bchain5. It lets our user Jane easily interact with the blockchain, by hiding many of the technical details about the functioning of the blockchain.

By default, if the app starts, it contacts its server, where the server is assumed to know how to submit or get data from the blockchain.

Now imagine there is another address in the deep link, in the manner described earlier in this submission. We can have "bchain5://texasfront.org: 3001" and "bchain5://ohiofront.com:4004". There could be several deep links corresponding to the same blockchain. Each address after the "://" might be that of a preferred or special node in the blockchain. This assumes that the blockchain allows such nodes. In peer to peer networks, for example, there can be super peers, or peers with different resources than most peers. Likewise for the computers that form the blockchain, some might differ from the others.

The deep link would be executed where the bchain5 app is started on Jane's device, and given the input of the deep link or the part after "://". So the app starts and connects to e.g. texasfront.org at port 3001.

Blockchain preferred nodes can specialise in interacting with users in a user friendly manner. They are the servers that answer the bchain5 app. A server should not be regarded as another instance of the bchain5 app, unlike say the case of multiplayer game apps.

In the above examples of deep links, links have addresses which are domain names and not raw network addresses. The latter is likely when there might be 2 mobile devices, using instances of the same app to interact with each other. The mobile devices might only have temporary network addresses, with no domain names that map to these addresses because of the transient nature of the addresses.

In contrast, preferred nodes whose addresses are in the deep links are likely to be non-mobile and having long term connections to the network. The nodes can and preferably should have domain names, where these can have some semantic meaning to many users.

One way that a preferred node on a blockchain can differ with regular nodes is a geographic bias. We described in earlier sections how a blockchain might have a geographic focus. Similarly, a preferred node might be in Texas, at the domain texasfront.org. A user in or around Texas might choose to connect to this, perhaps for faster response. An analogy is web pages used for downloading programs. Some web pages list servers throughout the US or the world, so that users can pick a nearby server.

We described preferred nodes as possible addresses in a deep link. A variant is where these are not nodes in the blockchain. They do not directly hold a copy or some subset of the data. Instead, they are servers that act as front ends to the blockchain, handling the necessary low level details of this, to prevent the user, or more precisely the user app, from having to understand and do the latter.

Another variant is where they do hold data. They make any necessary signings or hashings of the data. These much smaller quantities are written to the blockchain. This can be for blockchains that restrict the amount of data in each entry, to be essentially signatures or hashes.

Figure 13:
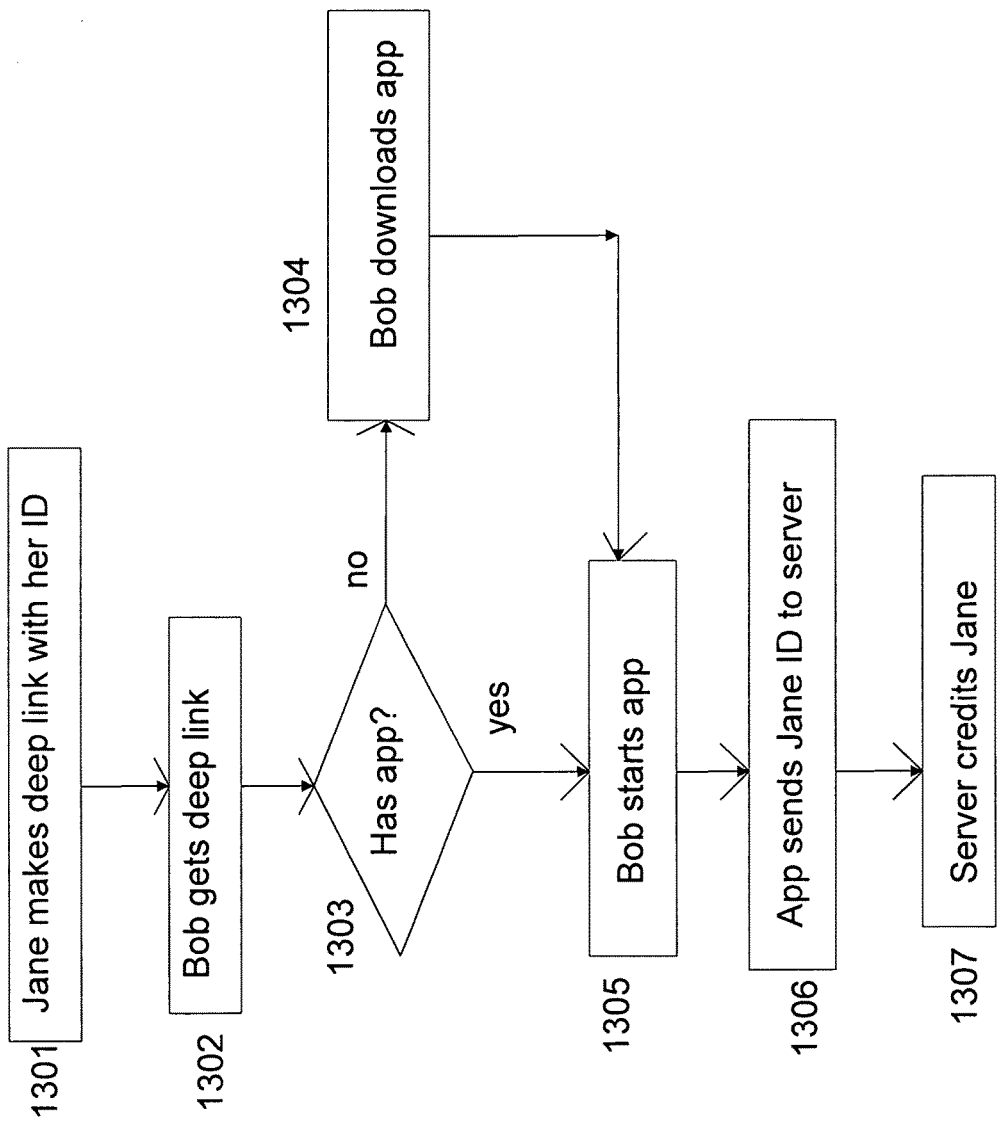
FIG. 13 is the crediting of Jane when Bob gets a deep link from her.

11: Crediting the Originator of a Deep Link;

This section expands on the discussion about the use of a deep link that was given in submissions 10 and 11. See FIG. 13. Suppose there is a user Jane with her device (probably a mobile device). It runs app madcow. Imagine first that the app can be run in single user mode. Perhaps this is the only mode. She wants to spread the use of the app. The company making the app wants this, and might compensate her in some way if she does this. Item 1301 is where her app instance makes a deep link. In the prior art, this might be "madcow://" or some equivalent syntax. The deep link thus far does not have her device address or any other identifier of her.

Now she wants to put an identifier of her's into the deep link. So when the app server finds out that another person has installed or run the app, due to her deep link, she gets credit from the server. What can this identifier be? For simplicity, assume it is her device address, 10.11.12.13. So the deep link might look like "madcow://10.11.12.13". This notation deliberately is the same as in submission 11 and in this submission, where it was assumed that her instance would wait for another instance to contact it. In general, different notation can be used here, like "madcow://s=10.11.12.13". But we will use the former notation.

There is no requirement that her instance can interact with another with a direct network access. Her instance can write the deep link and any associated data to the blockchain, as proof that she made the deep link.

Item 1302 is where Bob has a device, at some network address, and the device gets the deep link. Methods for Bob to do this were discussed in submission 10. Item 1303 is where Bob's device has some software (we called it a Deep Linker) that parses the deep link and gets the name or id of the app—"madcow". The Deep Linker asks if the device already has this app installed. If no, then item 1304 is where Bob's device downloads the app from an App Store or app server.

If yes, then we go directly to item 1305, where the app is started. The instance gets the deep link or a part of it that has Jane's id. In item 1306, the app sends Jane's ID to the app server. For most apps, the app server exists, and is contacted by the app when it starts. We assume this to be the case in this section.

Optionally Bob's instance can write the deep link he got from Jane to the blockchain. This can include any associated data, including preferably Bob's device address or any other relevant information about Bob.

Here is the key point. The app server knows whether Bob's instance is a new instance or he is running an instance that was installed earlier, prior to any current interaction with Jane. In general, separate from this submission's discussion of deep links, it is reasonable that an app server maintains this rudimentary requirement, if only to supervise and monetise its user base.

Here, when the app server gets Jane's id, it can credit her accordingly. For example, if Bob has installed a new instance due to her deep link, she is credited some amount. Otherwise she might get less or no credit. Bob being a new user could be more valuable to the app company than if he is an existing user. As a practical matter, the hardest hurdle may have been overcome. Getting a copy of the app onto his device, because in the prior art, this might involve many manual steps. Worse, the sheer proliferation of mobile apps (currently perhaps over a million each for Android and iPhone) means that it is harder (and harder) for a given app to be found on the default app stores. Getting Bob to be even aware of the existence of a particular app may be the hardest part.

Her id might be her device network address. However, as this could change, depending on her location and thus if her device gets assigned a temporary address, then her id could be something else. For example, when she signed up with the app server, it might have asked for her email address or phone number. Either might be used as her id to be put into the deep link in item 1301.

A possible drawback is that she might not want this exposed publicly, since the deep link may be widely disseminated. An alternative uses a pseudo-random bit sequence assigned to her by the app server, which maintains an internal table mapping from the sequence to her actual username or other identifying information.

There are elaborations. The crediting of Jane by the app server might not happen immediately after Bob's instance calls the server. If the app is a game, many mobile games are often freemium. The user plays for free for some initial time. After which he might be asked to pay. Or he can always play for free, but gets ads, and if he wants no ads, then he pays. Or there might be items for sale in the game. So the app server could hold off crediting Jane until when and if Bob actually pays something.

Another nuance is the amount of credit Jane gets could also be a function not just of Bob's first payment, but of all his payments over some time interval.

This can be carefully extended. If Bob recruits other new players, then he gets some of their revenue stream. Jane might also partake because she got Bob in the first place. Caution is needed as this is or can be very close to Multi Level Marketing.

Above, we described the app as single user. But if the app is multiuser, then the discussion still holds.

The writing of the deep link by the parties that made the deep link and got the deep link can be used as an audit trail. In part to help Jane prove the value of the deep link she made.

12: Changing a Deep Link;

This section describes how showing a deep link on an alterable medium can lead to showing other deep links. By alterable, we mean, as one example, where the deep link appears on an electronic screen. See FIG. 14. It shows Bob 1401 with a device 1402. The latter can be a cellphone, for example. In general, it can be, but is not limited to, a mobile device. Bob runs an app that makes a deep link and sends it with any related data about him or his device to Queue 1403. The deep link has an id of an app and the network address of device 1402. For example, "madcow://40.41.42.43".

Queue 1403 is a computer on a network, where the computer holds a data structure which for the moment we consider to be a queue. A first in first out [FIFO] structure, for example. The sending of data to it is step [1] in the figure, with the label "deep link". This emphasises that the data sent from device 1402 to Queue 1403 has the deep link as the key data content. For space considerations, the label does not describe that other data might be transferred from device 1402. Queue 1403 also depicts other data about other users and devices, labelled as Laura, Deepto etc. We choose to describe the data by the names of the users, to personalise the data and make it more obvious to the reader.

For a FIFO queue, we suppose that Bob submitted his data before Laura, and she submitted her data before Deepto and so on.

In step [2], there is a computer called Controller 1404 that takes data from Queue 1403 and which also has some control over Queue 1403. In some cases Controller 1404 and Queue 1403 may be on the same machine, as 2 programs. Or they might be different modules of a single program on a machine. The controller controls Screen 1405 in step [3]. On that screen are images. Some or all of the images can show a barcode 1406. When the barcode appears, it could be all or part of the image. The figure depicts barcode 1406 with the label QR, to suggest a QR barcode. Other types of barcodes could be shown.

The rest of the image might show information about Bob (including perhaps an image of him). The information could come from step [1]. Or there might have been an earlier stage, where Bob signed up with Queue 1403 or Controller 1404 and uploaded information about himself. Then in steps [1] and [2], Bob sent some id of himself (like a username or handle). Queue 1403 or Controller 1404 used this to map to the other and lengthier information, which is then shown on Screen 1405.

Near Screen 1405 is Jane 1407 with her device 1408. Typically this would be a cellphone. Device 1408 is assumed to have a camera (not shown) and wireless access to a network, where the network is taken to be the Internet.

When we said the controller controls Screen 1405, a variant is where the controller sends inputs to another computer (not shown), where the latter directly controls Screen 1405.

Barcode 1406 encodes the deep link and possibly other related data. The related data might be any uploaded by Bob in step [1]. It could also be other data that was supplied by the controller.

In step [4], device 1408 scans barcode 1406 and decodes it into the deep link and any related data. A program that might be the Deep Linker (that was explained in submissions 10 and 11 and earlier in this submission) installs the app mentioned in the deep link, and runs it with device 1402's address that was in the deep link. Her app communicates in step [5] with the app on device 1402.

For brevity, the labels [2], [3], [4] and [5] omit "deep link" that was part of [1]. But it is assumed that the deep link in step [1] is transmitted in all of the other steps.

There is now an interaction between Jane and Bob's apps. Different instances of the same app or instances of different apps. Often, their instances would also talk to the servers that correspond to those apps. Strictly, an app does not need a server, but as a practical matter most apps do. During the interaction, the controller is told of this. There is no explicit depiction of this in FIG. 14.

There are several ways for the controller to be informed. One way is to suppose that Jane and Bob are using different instances of the same app. Its app server would record that Jane and Bob's devices are doing this. The app server tells Controller 1404. Or more simply, the server tells Controller 1404 that Bob's instance is now in use, but does not give any information about Jane's instance.

Another way is for one or both of Jane and Bob's instances (whether they are instances of the same app or different apps) to directly tell Controller 1404. An implementation could have been that when the Controller got the deep link, it appended its address. This tells either Jane or Bob, when they get the deep link, how to contact the Controller.

Extending this, the Controller could append an identifier of Screen 1405. Perhaps the Controller controls several screens, and different screens might show different content.

So when Jane scans barcode 1406, either her instance or Bob's instance tells the Controller which screen is involved.

There could be other ways for the Controller to be informed.

Now assume this was done by any means. The Controller tells Queue 1403 to remove Bob. Queue 1403 pushes Laura to the front of the queue (or the top of the stack) and sends information about her, including a deep link to her instance of an app, to Controller 1404. The latter shows the information on Screen 1405. Barcode 1406 is updated to now encode Laura's deep link.

One variant of the above is in Queue 1403. In general, this could be a set of information about various users who have uploaded information, including deep links, of their app instances. Queue 1403 uses various criteria to decide what to send Controller 1404.

In turn, a variant of the previous paragraph is where Controller 1404 decides what criteria and tells these to Queue 1403.

Another variant is that Screen 1405 might cycle through showing information about different users. One page might just show information about Bob, the next page shows information about Laura, the next page about Deepto. Then those 3 pages repeat.

A variant is where the barcode encodes a deep link that points at an instance of an app not affiliated with a particular user. Jane uses her instance to search for users. Once she picks a user, she communicates with that user's app instance via a deep link.

Figure 14:
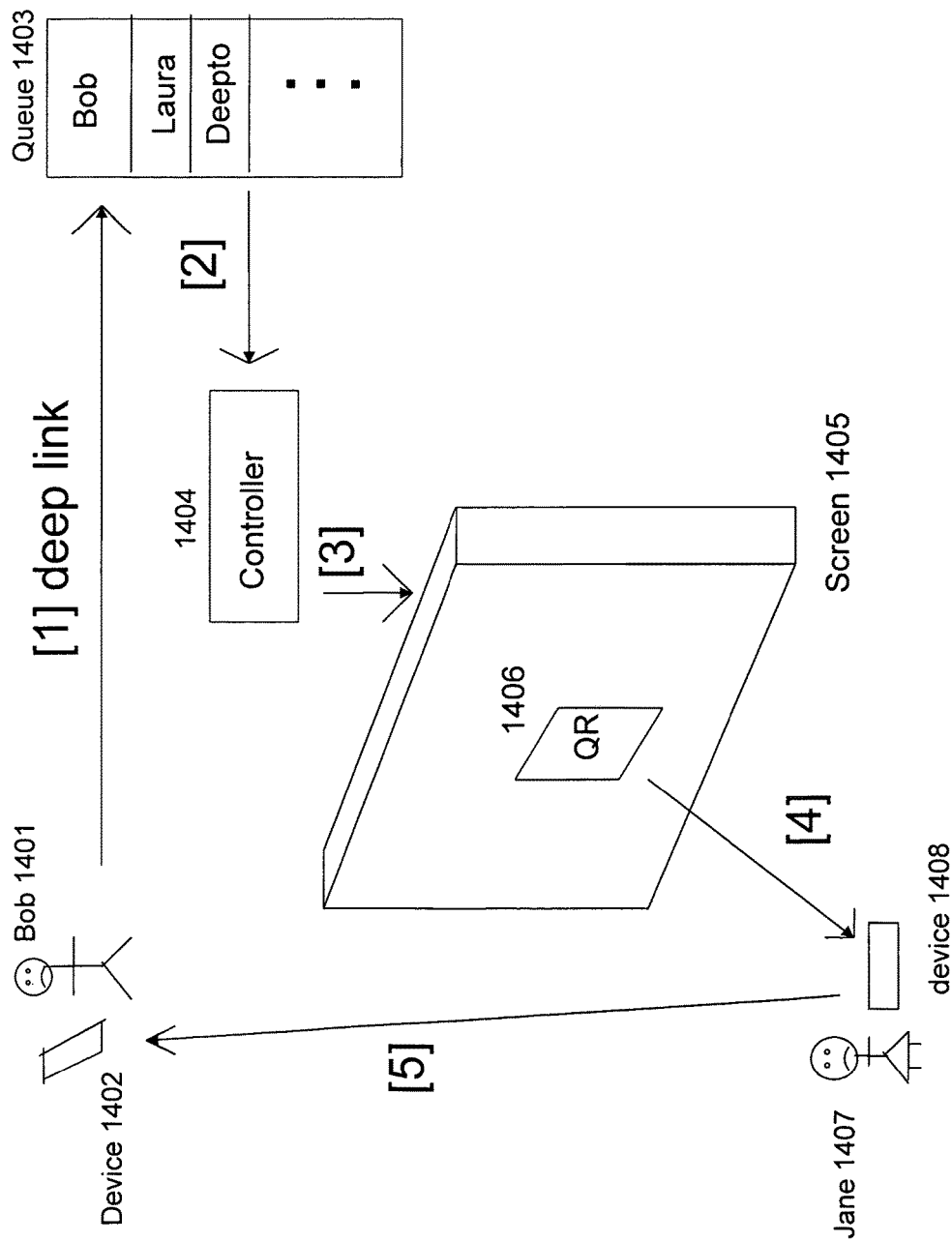
FIG. 14 is changing a deep link on a screen.

Why would FIG. 14 and any of the above happen? One possibility relates to companies like Uber, Lyft, Sidecar and TaskRabbit. Individuals sign up to provide services like car rides. Our submission could be for a firm with screens in publicly accessible areas. The screens show one or more users offering various services. Customers like Jane are near a screen. The one click aspect of scanning the barcode with her camera is a user friendly way for her to become a customer of Bob.

Thus far, this section described using a barcode on a screen to show a deep link. A variant is to have a loudspeaker near Screen 1405. The speaker plays an encoding that is essentially the deep link. The speaker is controlled by Controller 1404.

The encoding could be in the form of a "chirp". This is an approach made by Bergel et al, "Data Communication System", filed 5 Apr. 2012, US patent application 20120084131. Basically, in our submission the deep link is sent to a chirp server that makes a fixed length representation of it, like a hash. The hash is converted to an audio representation that sounds like bird song (hence chirp). The speaker plays the chirp. Jane uses her device to record and decode the chirp into the hash. The hash is sent to the chirp server which returns the original deep link to her device.

In the audio played by the speaker, one variant has only some of the audio being the chirp. The rest of the audio could be information telling something about the user associated with the chirp. The audio could also tell Jane that the bird song in the audio is an encoded deep link, with instructions on how to decode it.

For sound there might not be an associated Screen 1405. But if Screen 1405 exists, it could show text and images related to what sound is played. These try to persuade Jane to record the sound.

Both sound and the barcode could be used. If so, they could encode different deep links and related data. One reason is that the deep links are identical except for a parameter that indicates whether the deep link was encoded as a barcode or as sound. This lets the controller, if it eventually gets the deep link, to amass statistics on which is the preferred way for users to get the deep link.

Another way to convey the deep link from the controller to Jane's device can be via a wireless transmitter (like a "beacon") associated with Screen 1405. Like Bluetooth, WiFi or RFID. For RFID, the tag can be read only or a rewriteable tag.

For a user whose deep link is used, the amount of time that her deep link is shown or broadcast can be determined in part or entirely by a "bid" she puts to Controller 1404. This could be a monetary amount.

In FIG. 14, the queue has entries associated with different people and their devices. A variant is where some entries refer to standalone devices not associated with humans. These devices might be stationary or mobile. An example of a mobile device might be a device that is part of a moving vehicle, like a train, bus or ferry. The device need not be an intrinsic part of the vehicle (a part attached at manufacture) but added later.

An example of a user app in Jane's device that talks to an automated device might be where the app lets her see the current location and views from an incoming ferry.

For automated devices listening to user apps, when one such user app connects to the device, the barcode (or audio) in FIG. 14 might not change. Because the device could have the ability to answer more queries from other users. Whereas if the device has an active user (Bob) involved, then Bob might only be able to interact with one user (Jane) at a time.

This leads to another case. Suppose there is a multiplayer game with more than 2 players. Bob starts the game on his app as the first player. Jane scans the barcode and becomes the second player. There can be (or must be) at least a third player. The barcode on the screen could persist as encoding Bob's deep link, to let another person scan it.

Continuing this, suppose the Controller in FIG. 14 controls several screens, perhaps in different locations. Two screens might show Bob's deep link. When one screen has its deep link scanned by Jane, the Controller might decide to have both screens continue to show Bob's deep link, or one screen might show something else.

I claim:

1. A method of a device on a network running a software application, the method comprising:
   receiving and storing, by the device, a list of blockchains, wherein each blockchain in the list of blockchains is associated with a geographical region;
   receiving, by the device, an input from a user;
   determining, by the device, using GPS and based on the input, a location of the device;
   generating, by the device and based on the location of the device, a deep link, wherein the deep link includes a) data associated with the software application, b) a network address of the device, c) the location of the device;
   selecting, by the device, a blockchain from the list of blockchains, based on the determined location of the device;
   writing, by the device, the deep link to the selected blockchain from the list of blockchains;
   receiving, by the device, a request, from the selected blockchain, for accessing the software application by a second device; and
   providing to the second device, by the device, access to the software application, at least based on the deep link.

2. The method of claim 1 further comprising:
   prior to writing, by the device, the deep link to the selected blockchain:
   generating a cryptographic signature, by the device and based on the input from the user; and
   appending, by the device, the cryptographic signature to the deep link.

* * * * *